US011388586B2

(12) United States Patent
Yang et al.

(10) Patent No.: US 11,388,586 B2
(45) Date of Patent: Jul. 12, 2022

(54) DOWNLINK CONTROL CHANNEL MONITORING CAPABILITY FOR ULTRA-RELIABLE LOW-LATENCY COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Seyed Ali Akbar Fakoorian, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 16/863,729

(22) Filed: Apr. 30, 2020

(65) Prior Publication Data
US 2020/0351644 A1 Nov. 5, 2020

Related U.S. Application Data

(60) Provisional application No. 62/843,232, filed on May 3, 2019.

(51) Int. Cl.
*H04W 72/04* (2009.01)
*H04W 8/24* (2009.01)
*H04W 24/08* (2009.01)

(52) U.S. Cl.
CPC ............. *H04W 8/24* (2013.01); *H04W 24/08* (2013.01); *H04W 72/042* (2013.01); *H04W 72/0446* (2013.01)

(58) Field of Classification Search
CPC ... H04W 8/24; H04W 24/08; H04W 72/0446; H04W 72/042; H04W 72/1289; H04L 5/001; H04L 5/0064; H04L 5/14
See application file for complete search history.

(56) References Cited

U.S. PATENT DOCUMENTS 9,226,290 B2* 12/2015 Gaal ................. H04W 56/0005
2012/0113866 A1* 5/2012 Tenny .................. H04W 24/10
370/254

(Continued)

OTHER PUBLICATIONS

Huawei, et al., "CORESET Configuration and Search Space Design,", 3GPP Draft, 3GPP TSG RAN WG1 Meeting AH_NR#3, R1-1715395, 3rd Generation Partnership Project (3GPP), Mobile Competence Centre, 650, Route Des Lucioles, F-06921, Sophia-Antipolis Cedex, France, vol. RAN WG1, No. Nagoya, Japan; Sep. 18, 2017-Sep 21, 2017, Sep. 11, 2017 (Sep. 11, 2017), 10 pages, XP051329020, Retrieved from the Internet: URL: http://www.3gpp.org/ftp/tsg_ran/WG1_RL1/TSGR1_AH/NR_AH_1709/Docs/ [retrieved on-Sep. 11, 2017] Par. 2.2.2.

(Continued)

*Primary Examiner* — Wei Zhao
(74) *Attorney, Agent, or Firm* — Qualcomm Incorporated

(57) ABSTRACT

Methods, systems, and devices for wireless communications are described. A user equipment (UE) may identify a baseline physical downlink control channel (PDCCH) monitoring capability of the UE and an enhanced PDCCH monitoring capability of the UE, where the enhanced PDCCH monitoring capability facilitates monitoring by the UE of more PDCCH monitoring opportunities per slot than the baseline PDCCH monitoring capability. The UE may report, to a base station, the enhanced PDCCH monitoring capability and also the baseline PDCCH monitoring capability. The UE may receive, based on the UE reporting the enhanced PDCCH monitoring capability, at least one control resource set configuration that includes an indication that a corresponding control resource set is configured for enhanced PDCCH monitoring. The UE may monitor the corresponding control resource set in accordance with the enhanced PDCCH monitoring capability of the UE.

30 Claims, 15 Drawing Sheets

(56) References Cited

U.S. PATENT DOCUMENTS

2015/0163029 A1 6/2015 Murakami et al.
2019/0349180 A1* 11/2019 Lu .................. H04W 72/0446

OTHER PUBLICATIONS

International Search Report and Written Opinion—PCT/US2020/031071—ISA/EPO—dated Aug. 14, 2020.
OPPO: "PDCCH Enhancement for URLLC," 3GPP Draft, 3GPP TSG RAN WG1 Meeting #95, R1-1812815, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 3, 2018 (Nov. 3, 2018),4 pages, XP051479060, Retrieved from the Internet: URL: http://www.3gpp.org/ftp/tsg%5Fran/WG1%5FRL1/TSGR1%5F95/Docs/R1%2D1812815%2Ezip [retrieved on Nov. 3, 2018] Par. 2.1-2.2 figure 1.
Vivo: "Remaining Details on PDCCH Search Space," 3GPP Draft, 3GPP TSG RAN WG1 Meeting #92, R1-1801531, Remaining Details on PDCCH Search Space—Final, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 2, 2018, Feb. 15, 2018 (Feb. 15, 2018), pp. 1-6, XP051396783, Retrieved from the Internet:URL:http://www.3gpp.org/ftp/tsg%5Fran/WG1%5FRL1/TSGR1%5F92/Docs/ retrieved on Feb. 15, 2018], Par. 2.4, figure 1.

* cited by examiner

DOWNLINK CONTROL CHANNEL MONITORING CAPABILITY FOR ULTRA-RELIABLE LOW-LATENCY COMMUNICATIONS

CROSS REFERENCE

The present Application for Patent claims the benefit of U.S. Provisional Patent Application No. 62/843,232 by YANG et al., entitled "DOWNLINK CONTROL CHANNEL MONITORING CAPABILITY FOR ULTRARELIABLE LOW-LATENCY COMMUNICATIONS," filed May 3, 2019, assigned to the assignee hereof, and expressly incorporated by reference herein.

BACKGROUND

The following relates generally to wireless communications, and more specifically to downlink control channel monitoring capability for ultra-reliable low-latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may be configured to monitor downlink control channels and perform blind decodings to identify and receive downlink control information from a base station. In some cases, a UE may be configured for carrier aggregation, which may involve multiple carriers, each of which may be monitored by the UE for downlink control channels.

SUMMARY

The described techniques relate to improved methods, systems, devices, and apparatuses that support downlink control channel monitoring capability for ultra-reliable low-latency communications. Generally, the described techniques provide for enhanced downlink control channel monitoring. A base station and a user equipment (UE) may communicate via a primary cell and one or more secondary cells. The UE may monitor for downlink control channel signaling (e.g., physical downlink control channel (PDCCH) signaling) during downlink control channel monitoring occasions and perform blind decodings to detect and receive downlink control information (DCI) from the base station. The UE may support the monitoring of multiple PDCCH monitoring occasions (e.g., monitoring spans) within a single slot.

A UE described herein may support monitoring an increased number of control channel elements and performing an increased number of blind decodings per slot by implementing enhanced PDCCH monitoring techniques. In some cases, the increased blind decoding limit and control channel element limits may be based on a smaller time unit (e.g., a sub-slot or one or more symbol periods). In some cases, the enhanced PDCCH monitoring techniques may be implemented at the same time as baseline PDCCH monitoring techniques. The enhanced PDCCH monitoring techniques may support the UE in performing additional (e.g., more than the baseline PDCCH monitoring) blind decodings and monitor additional control channel elements on some control resource sets, search spaces, or both. In some cases, each monitoring span may have its own blind decodings limit, control channel element limit, or both.

The UE may report a baseline UE capability and an enhanced UE capability. For example, the baseline UE capability may indicate a number of cells the UE can support for baseline PDCCH monitoring, and the enhanced UE capability may indicate a number of cells the UE can support for enhanced PDCCH monitoring. The UE may also report a number of control resource sets and a number of search spaces that the UE supports for enhanced PDCCH monitoring on a cell, a number of DCI sizes that support the enhanced monitoring, control channel element and blind decoding limits per monitoring span under the enhanced PDCCH monitoring, or a combination thereof.

The base station may include an indication of whether a downlink control channel is configured for either a baseline PDCCH monitoring or an enhanced PDCCH monitoring. In some instances, the indication may be included in a control resource set configuration. In other instances, the indication may be included in a search space configuration.

In some cases, enhanced PDCCH monitoring may support overbooking. In some cases, overbooking may only be supported on the primary cell. If the UE is configured with both baseline PDCCH monitoring and enhanced PDCCH monitoring on the primary cell, then overbooking may only be supported for control resource sets or search spaces with baseline PDCCH monitoring. For example, the UE may not expect overbooking for control resource sets or search spaces with the enhanced PDCCH monitoring. If every search space and control resource set on the primary cell is configured for enhanced PDCCH monitoring, then overbooking may be supported for a first (e.g., first in the slot) monitoring span of the configured monitoring spans in the slot. In some cases, the first monitoring span may be less likely to carry DCI scheduling information and may generally have a lower priority than the other monitoring spans.

A method of wireless communication at a UE is described. The method may include identifying a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, reporting, to a base station, the enhanced downlink control channel monitoring capability and also the baseline downlink control channel monitoring capability, receiving, based at least on the UE reporting the enhanced downlink control channel monitoring capability, a configuration for enhanced downlink control channel monitoring, and monitoring one or more downlink control channels in accordance with the enhanced downlink control channel monitoring capability of the UE.

An apparatus for wireless communication at a UE is described. The apparatus may include a processor, memory coupled with the processor, and instructions stored in the memory. The instructions may be executable by the processor to cause the apparatus to identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, report, to a base station, the enhanced downlink control channel monitoring capability and also the baseline downlink control channel monitoring capability, receive, based at least on the UE reporting the enhanced downlink control channel monitoring capability, a configuration for enhanced downlink control channel monitoring, and monitor one or more downlink control channels in accordance with the enhanced downlink control channel monitoring capability of the UE.

Another apparatus for wireless communication at a UE is described. The apparatus may include means for identifying a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, reporting, to a base station, the enhanced downlink control channel monitoring capability and also the baseline downlink control channel monitoring capability, receiving, based at least on the UE reporting the enhanced downlink control channel monitoring capability, a configuration for enhanced downlink control channel monitoring, and monitoring one or more downlink control channels in accordance with the enhanced downlink control channel monitoring capability of the UE.

A non-transitory computer-readable medium storing code for wireless communication at a UE is described. The code may include instructions executable by a processor to identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, report, to a base station, the enhanced downlink control channel monitoring capability and also the baseline downlink control channel monitoring capability, receive, based at least on the UE reporting the enhanced downlink control channel monitoring capability, a configuration for enhanced downlink control channel monitoring, and monitor one or more downlink control channels in accordance with the enhanced downlink control channel monitoring capability of the UE.

In some examples of the method, apparatuses, and non-transitory computer-readable medium described herein, the receiving may include operations, features, means, or instructions for receiving at least one control resource set configuration that includes an indication that a corresponding control resource set may be configured for enhanced downlink control channel monitoring.

In some examples of the method, apparatuses, and non-transitory computer-readable medium described herein, the receiving may include operations, features, means, or instructions for receiving a first search space configuration for a first search space of a set of search spaces associated with a control resource set, where the first search space configuration indicates that the first search space may be configured for enhanced downlink control channel monitoring, and receiving a second search space configuration for a second search space of the set of search spaces associated with the control resource set, where the second search space configuration indicates that the second search space may be configured for baseline downlink control channel monitoring.

In some examples of the method, apparatuses, and non-transitory computer-readable medium described herein, reporting the enhanced downlink control channel monitoring capability and also the baseline downlink control channel monitoring capability may include operations, features, means, or instructions for reporting a first number of cells for which the UE supports the enhanced downlink control channel monitoring, and reporting a second number of cells for which the UE supports the baseline downlink control channel monitoring.

In some examples of the method, apparatuses, and non-transitory computer-readable medium described herein, the first number of cells may be less than or equal to a number of cells for which the UE supports a shorter of two different minimum downlink processing times.

Some examples of the method, apparatuses, and non-transitory computer-readable medium described herein may further include operations, features, means, or instructions for determining that a number of cells configured for enhanced downlink control channel monitoring exceeds the first number of cells.

In some examples of the method, apparatuses, and non-transitory computer-readable medium described herein, a number of blind decodings for the enhanced downlink control channel monitoring may be based on an equal split of a maximum number of blind decodings across a number of cells configured for the enhanced downlink control channel monitoring, and a number of control channel elements for the enhanced downlink control channel monitoring may be based on an equal split of a maximum number of control channel elements across the number of cells configured for the enhanced downlink control channel monitoring.

Some examples of the method, apparatuses, and non-transitory computer-readable medium described herein may further include operations, features, means, or instructions for identifying a per cell maximum number of blind decodings supported by the UE, determining an overall maximum number of blind decodings supported by the UE by multiplying the per cell maximum number with the first number of cells, and distributing the overall maximum number of blind decodings across the number of cells configured for enhanced downlink control channel monitoring.

In some examples of the method, apparatuses, and non-transitory computer-readable medium described herein, the overall maximum number of blind decodings may be distributed uniformly across the number of cells configured for enhanced downlink control channel monitoring.

Some examples of the method, apparatuses, and non-transitory computer-readable medium described herein may further include operations, features, means, or instructions for identifying a per cell maximum number of control channel element processing supported by the UE, determining an overall maximum number of control channel element processing supported by the UE by multiplying the per cell maximum number with the first number of cells, and distributing the overall maximum number of control channel element processing across the number of cells configured for enhanced downlink control channel monitoring.

In some examples of the method, apparatuses, and non-transitory computer-readable medium described herein, the overall maximum number of control channel element processing may be distributed uniformly across the number of cells configured for enhanced downlink control channel monitoring.

In some examples of the method, apparatuses, and non-transitory computer-readable medium described herein, receiving the configuration may include operations, features, means, or instructions for receiving a control resource set configuration for each of a set of serving cells with which the UE communicates, where each control resource set configuration identifies whether a respective serving cell may be configured for enhanced downlink control channel monitoring, baseline downlink control channel monitoring, or both.

In some examples of the method, apparatuses, and non-transitory computer-readable medium described herein, the configuration identifies that a respective serving cell may be only configured for enhanced downlink control channel monitoring if the respective serving cell may be also configured for a shorter of two different minimum downlink processing times.

In some examples of the method, apparatuses, and non-transitory computer-readable medium described herein, the configuration identifies that a respective serving cell may be configured for enhanced downlink control channel monitoring when the respective serving cell may be also configured for only a slower of two different minimum downlink processing times only if the respective serving cell may be further limited to include fewer than a maximum number of downlink control channel monitoring spans per slot.

Some examples of the method, apparatuses, and non-transitory computer-readable medium described herein may further include operations, features, means, or instructions for reporting, to the base station, control resource set or search space limits supported by the UE that correspond with a number of control resource sets per cell or a number of search spaces per cell the UE may be capable of supporting with the enhanced downlink control channel monitoring.

Some examples of the method, apparatuses, and non-transitory computer-readable medium described herein may further include operations, features, means, or instructions for reporting, to the base station, a number of downlink control information sizes supported by the UE for the enhanced downlink control channel monitoring capability.

Some examples of the method, apparatuses, and non-transitory computer-readable medium described herein may further include operations, features, means, or instructions for reporting, to the base station, a per downlink control channel monitoring span blind decoding limit or a per downlink control channel monitoring span control channel element processing limit supported by the UE that corresponds with the enhanced downlink control channel monitoring capability.

Some examples of the method, apparatuses, and non-transitory computer-readable medium described herein may further include operations, features, means, or instructions for applying downlink control channel limits for enhanced mobile broadband communications and ultra-reliable low-latency communications separately on a same cell.

In some examples of the method, apparatuses, and non-transitory computer-readable medium described herein, a control resource set may be configured for either enhanced downlink control channel monitoring or baseline downlink control channel monitoring.

Some examples of the method, apparatuses, and non-transitory computer-readable medium described herein may further include operations, features, means, or instructions for receiving a search space configuration for a search space, identifying, from the search space configuration, whether the search space may be associated with either a control resource set configured for enhanced downlink control channel monitoring or a control resource set configured for baseline downlink control channel monitoring, and monitoring the search space in accordance with the control resource set with which the search space may be associated.

Some examples of the method, apparatuses, and non-transitory computer-readable medium described herein may further include operations, features, means, or instructions for applying a downlink control information size limit, a per downlink control channel monitoring span blind decoding limit, or a per downlink control channel monitoring span control channel element processing limit based on a number of search spaces associated with control resource sets configured for enhanced downlink control channel monitoring and a set of downlink control channel candidates, associated with the search spaces, corresponding to the enhanced downlink control channel monitoring.

In some examples of the method, apparatuses, and non-transitory computer-readable medium described herein, receiving the configuration may include operations, features, means, or instructions for receiving a set of control resource set configurations, each for a corresponding control resource set, where a first portion of the corresponding control resource sets may be configured for enhanced downlink control channel monitoring and a second portion of the corresponding control resource sets may be configured for baseline downlink control channel monitoring.

Some examples of the method, apparatuses, and non-transitory computer-readable medium described herein may further include operations, features, means, or instructions for receiving search space configurations which result in overbooking of downlink control channel candidates to be monitored or non-overlapping control channel elements to be processed, where the search space configurations may be associated with only the second portion of the corresponding control resource sets.

In some examples of the method, apparatuses, and non-transitory computer-readable medium described herein, receiving the configuration may include operations, features, means, or instructions for receiving a set of control resource set configurations, each for a corresponding control resource set, where each of the corresponding control resource sets may be configured for enhanced downlink control channel monitoring.

In some examples of the method, apparatuses, and non-transitory computer-readable medium described herein, the set of control resource set configurations may be configured for a primary cell.

Some examples of the method, apparatuses, and non-transitory computer-readable medium described herein may further include operations, features, means, or instructions for dropping lower priority downlink control channel candidates associated with the first downlink control channel monitoring span based on the overbooking.

Some examples of the method, apparatuses, and non-transitory computer-readable medium described herein may further include operations, features, means, or instructions for receiving search space configurations, configured for enhanced downlink control channel monitoring, which result in overbooking of downlink control channel candidates to be monitored or non-overlapping control channel elements to be processed, where the overbooking of downlink control channel candidates occurs only in a first downlink control channel monitoring span of a slot.

Some examples of the method, apparatuses, and non-transitory computer-readable medium described herein may further include operations, features, means, or instructions for dropping lower priority downlink control channel candidates associated with the first downlink control channel monitoring span based on the overbooking.

In some examples of the method, apparatuses, and non-transitory computer-readable medium described herein, receiving the configuration may include operations, features, means, or instructions for receiving a set of search space configurations, each for a corresponding search space on a primary cell, where each of the corresponding search spaces may be configured for enhanced downlink control channel monitoring.

In some examples of the method, apparatuses, and non-transitory computer-readable medium described herein, the set of search space configurations result in overbooking of downlink control channel candidates to be monitored or non-overlapping control channel elements to be processed, where the overbooking of downlink control channel candidates occurs only in a first downlink control channel monitoring span of a slot.

In some examples of the method, apparatuses, and non-transitory computer-readable medium described herein, the set of search space configurations are configured for a primary cell.

Some examples of the method, apparatuses, and non-transitory computer-readable medium described herein may further include operations, features, means, or instructions for receiving search space configurations which result in overbooking of downlink control channel candidates to be monitored or non-overlapping control channel elements to be processed, where the overbooking may be associated with only downlink control channel monitoring spans that include common search spaces.

In some examples of the method, apparatuses, and non-transitory computer-readable medium described herein, the search space configurations may be further associated with only a portion of slots that include both common search spaces and UE-specific search spaces within the downlink control channel monitoring spans that include common search spaces and UE-specific search spaces.

Some examples of the method, apparatuses, and non-transitory computer-readable medium described herein may further include operations, features, means, or instructions for determining a downlink control channel monitoring span pattern based only on search spaces or control resource sets that may be configured for enhanced downlink control channel monitoring.

A method of wireless communication at a base station is described. The method may include receiving, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, transmitting, to the UE and based at least on receipt of the enhanced downlink control channel monitoring capability of the UE, a configuration for enhanced downlink control channel monitoring, and transmitting one or more downlink control channel messages on one or more downlink control channels in accordance with the configuration.

An apparatus for wireless communication at a base station is described. The apparatus may include a processor, memory coupled with the processor, and instructions stored in the memory. The instructions may be executable by the processor to cause the apparatus to receive, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, transmit, to the UE and based at least on receipt of the enhanced downlink control channel monitoring capability of the UE, a configuration for enhanced downlink control channel monitoring, and transmit one or more downlink control channel messages on one or more downlink control channels in accordance with the configuration.

Another apparatus for wireless communication at a base station is described. The apparatus may include means for receiving, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, transmitting, to the UE and based at least on receipt of the enhanced downlink control channel monitoring capability of the UE, a configuration for enhanced downlink control channel monitoring, and transmitting one or more downlink control channel messages on one or more downlink control channels in accordance with the configuration.

A non-transitory computer-readable medium storing code for wireless communication at a base station is described. The code may include instructions executable by a processor to receive, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, transmit, to the UE and based at least on receipt of the enhanced downlink control channel monitoring capability of the UE, a configuration for enhanced downlink control channel monitoring, and transmit one or more downlink control channel messages on one or more downlink control channels in accordance with the configuration.

In some examples of the method, apparatuses, and non-transitory computer-readable medium described herein, the transmitting may include operations, features, means, or instructions for transmitting at least one control resource set configuration that includes an indication that a corresponding control resource set may be configured for enhanced downlink control channel monitoring.

In some examples of the method, apparatuses, and non-transitory computer-readable medium described herein, the transmitting may include operations, features, means, or instructions for transmitting a first search space configuration for a first search space of a set of search spaces associated with a control resource set, where the first search space configuration indicates that the first search space may be configured for enhanced downlink control channel monitoring, and transmitting a second search space configuration for a second search space of the set of search spaces associated with the control resource set, where the second search space configuration indicates that the second search space may be configured for baseline downlink control channel monitoring.

In some examples of the method, apparatuses, and non-transitory computer-readable medium described herein, receiving the baseline downlink control channel monitoring capability and the enhanced downlink control channel monitoring capability may include operations, features, means, or instructions for receiving a first number of cells for which the UE supports the enhanced downlink control channel monitoring, and receiving a second number of cells for which the UE supports the baseline downlink control channel monitoring.

In some examples of the method, apparatuses, and non-transitory computer-readable medium described herein, the first number of cells may be less than or equal to a number of cells for which the UE supports a shorter of two different minimum downlink processing times.

In some examples of the method, apparatuses, and non-transitory computer-readable medium described herein, transmitting the configuration may include operations, features, means, or instructions for transmitting a control resource set configuration for each of a set of serving cells with which the base station communicates with the UE, where each control resource set configuration identifies whether a respective serving cell may be configured for enhanced downlink control channel monitoring, baseline downlink control channel monitoring, or both.

In some examples of the method, apparatuses, and non-transitory computer-readable medium described herein, the configuration identifies that a respective serving cell may be only configured for enhanced downlink control channel monitoring if the respective serving cell may be also configured for a shorter of two different minimum downlink processing times.

In some examples of the method, apparatuses, and non-transitory computer-readable medium described herein, the configuration identifies that a respective serving cell may be configured for enhanced downlink control channel monitoring when the respective serving cell may be also configured for only a slower of two different minimum downlink processing times only if the respective serving cell may be further limited to include fewer than a maximum number of downlink control channel monitoring spans per slot.

Some examples of the method, apparatuses, and non-transitory computer-readable medium described herein may further include operations, features, means, or instructions for receiving, from the UE, control resource set or search space limits supported by the UE that correspond with a number of control resource sets per cell or a number of search spaces per cell the UE may be capable of supporting with the enhanced downlink control channel monitoring.

Some examples of the method, apparatuses, and non-transitory computer-readable medium described herein may further include operations, features, means, or instructions for receiving, from the UE, a number of downlink control information sizes supported by the UE for the enhanced downlink control channel monitoring capability.

Some examples of the method, apparatuses, and non-transitory computer-readable medium described herein may further include operations, features, means, or instructions for receiving, from the UE, a per downlink control channel monitoring span blind decoding limit or a per downlink control channel monitoring span control channel element processing limit supported by the UE that corresponds with the enhanced downlink control channel monitoring capability.

In some examples of the method, apparatuses, and non-transitory computer-readable medium described herein, a control resource set may be configured for either enhanced downlink control channel monitoring or baseline downlink control channel monitoring.

Some examples of the method, apparatuses, and non-transitory computer-readable medium described herein may further include operations, features, means, or instructions for transmitting a search space configuration for a search space, where the search space configuration indicates whether the search space may be associated with either a control resource set configured for enhanced downlink control channel monitoring or a control resource set configured for baseline downlink control channel monitoring.

In some examples of the method, apparatuses, and non-transitory computer-readable medium described herein, transmitting the configuration may include operations, features, means, or instructions for transmitting a set of control resource set configurations, each for a corresponding control resource set, where a first portion of the corresponding control resource sets may be configured for enhanced downlink control channel monitoring and a second portion of the corresponding control resource sets may be configured for baseline downlink control channel monitoring.

In some examples of the method, apparatuses, and non-transitory computer-readable medium described herein, the set of control resource set configurations may be configured for a primary cell.

Some examples of the method, apparatuses, and non-transitory computer-readable medium described herein may further include operations, features, means, or instructions for transmitting search space configurations which result in overbooking of downlink control channel candidates to be monitored or non-overlapping control channel elements to be processed, where the search space configurations may be associated with only the second portion of the corresponding control resource sets.

In some examples of the method, apparatuses, and non-transitory computer-readable medium described herein, transmitting the configuration may include operations, features, means, or instructions for transmitting a set of control resource set configurations, each for a corresponding control resource set, where each of the corresponding control resource sets may be configured for enhanced downlink control channel monitoring.

In some examples of the method, apparatuses, and non-transitory computer-readable medium described herein, the set of control resource set configurations may be configured for a primary cell.

Some examples of the method, apparatuses, and non-transitory computer-readable medium described herein may further include operations, features, means, or instructions for transmitting search space configurations which result in overbooking of downlink control channel candidates to be monitored or non-overlapping control channel elements to be processed, where the overbooking may be associated with only in a first downlink control channel monitoring span of a slot.

Some examples of the method, apparatuses, and non-transitory computer-readable medium described herein may further include operations, features, means, or instructions for transmitting search space configurations which result in overbooking of downlink control channel candidates to be monitored or non-overlapping control channel elements to be processed, where the overbooking may be associated with only downlink control channel monitoring spans that include common search spaces.

In some examples of the method, apparatuses, and non-transitory computer-readable medium described herein, the search space configurations may be further associated with only a portion of slots that include both common search spaces and UE-specific search spaces within the downlink control channel monitoring spans that include common search spaces and UE-specific search spaces.

In some examples of the method, apparatuses, and non-transitory computer-readable medium described herein, transmitting the configuration may include operations, features, means, or instructions for transmitting a set of search space configurations, each for a corresponding search space on a primary cell, where each of the corresponding search spaces may be configured for enhanced downlink control channel monitoring.

DETAILED DESCRIPTION

Figure 1:
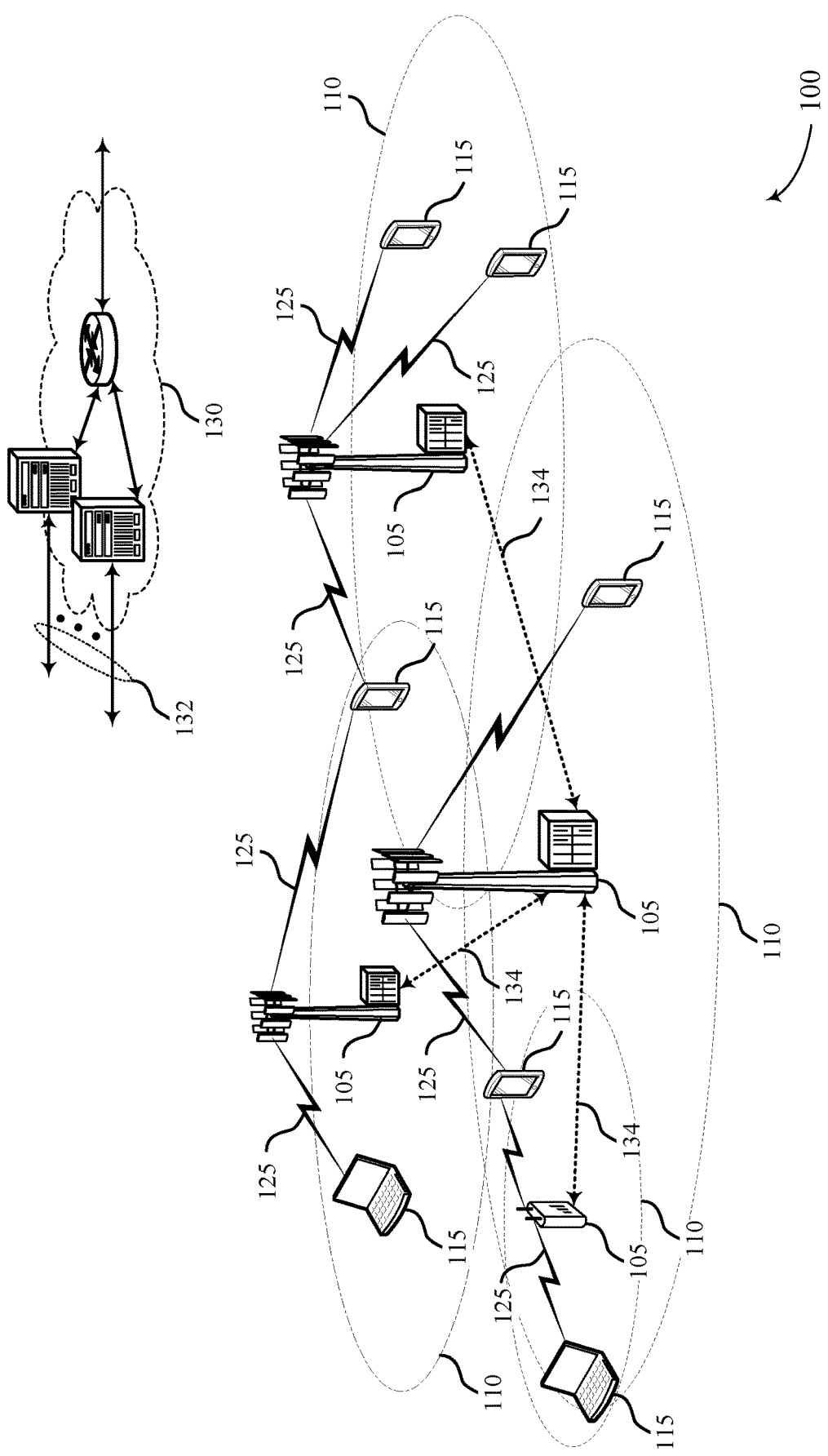
FIG. 1 illustrates an example of a system for wireless communications that supports downlink control channel monitoring capability for ultra-reliable low-latency communications in accordance with aspects of the present disclosure.

A base station and a user equipment (UE) may communicate according to a carrier aggregation configuration. The base station may provide a primary cell and one or more secondary cells for the UE. The base station and the UE may support different types of traffic on a single cell. For example, the UE and the base station may communicate using low latency communications, such as ultra-reliable low-latency communications (URLLC), and mobile broadband (MBB) or enhanced MBB (eMBB) on a single cell.

The UE may monitor for downlink control channel (e.g., physical downlink control channel (PDCCH)) signaling on a serving cell based on a set of constraints. For example, the UE may be capable of supporting a number of control resource sets, a number of search spaces, a number of downlink control information (DCI) sizes, a number of blind detection performances, a number of non-overlapping control channel elements, and a number of downlink control channels. The UE may indicate, as a UE capability, a number of component carriers the UE can support for downlink control channel blind detection. In some cases, the constraints may be based on the UE capability. The UE may monitor a PDCCH monitoring occasion and perform blind decodings based on the constraints to detect and receive DCI from the base station.

In some cases, the UE may be capable of supporting multiple PDCCH monitoring occasions, where each PDCCH monitoring occasion may be referred to as a monitoring span, within a single slot. In some systems, the number of blind decodings the UE can perform and the number of control channel elements the UE can monitor across all of the monitoring spans may be based on the reported UE capability. For example, despite having additional PDCCH monitoring occasions, the UE may have the same limits and configurations as though the UE were only capable of one PDCCH monitoring occasion. However, the UE may be capable of performing more blind decodings and monitoring more control channel elements across the multiple monitoring spans.

Therefore, in addition to supporting baseline PDCCH monitoring techniques, the UE may support enhanced PDCCH monitoring techniques. Where the baseline PDCCH monitoring techniques may have limits and constraints as described above, the enhanced PDCCH monitoring techniques may support the UE to perform additional blind decodings and monitor additional control channel elements on some control resource sets, search spaces, or both. In some cases, each monitoring span may have its own blind decodings limit, control channel element limit, or both. Each control resource set may be configured with a new parameter to indicate whether the control resource set supports enhanced PDCCH monitoring or not. If a control resource set is indicated to support enhanced PDDCH monitoring, the UE may then monitor that control resource set (e.g., and its associated search spaces) based on the techniques, parameters, and constraints of enhanced PDCCH monitoring. Generally, the techniques for enhanced PDCCH monitoring may provide improved decoding performance for UEs which support low latency communications.

The UE may report a baseline UE capability, an enhanced UE capability, or both. For example, the baseline UE capability may indicate a number of cells the UE can support for baseline PDCCH monitoring, and the enhanced UE capability may indicate a number of cells the UE can support for enhanced PDCCH monitoring. The UE may also report a number of control resource sets and a number of search spaces that the UE supports for enhanced PDCCH monitoring on a cell, a number of DCI sizes that support the enhanced monitoring, and control channel element and blind decoding limits per monitoring span under the enhanced PDCCH monitoring.

The base station may include an indication of whether a downlink control channel is configured for either a baseline PDCCH monitoring or an enhanced PDCCH monitoring. In some instances, the indication may be included in a control resource set configuration. In other instances, the indication may be included in a search space configuration.

In some cases, enhanced PDCCH monitoring may support overbooking. In some cases, overbooking may be supported on the primary cell. If the UE is configured with both baseline PDCCH monitoring and enhanced PDCCH monitoring on the primary cell, then overbooking may only be supported for control resource sets or search spaces with baseline PDCCH monitoring. For example, the UE may not expect overbooking for control resource sets or search spaces with the enhanced PDCCH monitoring. If every search space and control resource set on the primary cell is configured for enhanced PDCCH monitoring, then overbooking may be supported for a first (e.g., first in the slot) monitoring span of the configured monitoring spans in the slot. In some cases, the first monitoring span may have relatively more PDCCH candidates to monitor. For example, the first monitoring span may include both a common search space and a UE-specific search space, whereas the rest of the monitoring spans may only include a UE-specific search space, where the UE may monitor a specific type of DCI (e.g., just URLLC DCI). In some cases, overbooking may be configured for monitoring spans which have both a common search space and a UE-specific search space, and overbooking may not be configured for monitoring spans which have only a common search space or only a UE-specific search space.

Aspects of the disclosure are initially described in the context of a wireless communications system. Aspects of the disclosure are further illustrated by and described with reference to apparatus diagrams, system diagrams, and flowcharts that relate to downlink control channel monitoring capability for ultra-reliable low-latency communications.

FIG. 1 illustrates an example of a wireless communications system 100 that supports downlink control channel monitoring capability for ultra-reliable low-latency communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105.

The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ)

to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In addition to supporting baseline PDCCH monitoring techniques, a UE 115 may support enhanced PDCCH monitoring techniques. Where the baseline PDCCH monitoring techniques may have limits and constraints as described above, the enhanced PDCCH monitoring techniques may support the UE 115 to perform additional blind decodings and monitor additional control channel elements on some control resource sets, search spaces, or both. In some cases, each monitoring span may have its own blind decodings limit, control channel element limit, or both. Each control resource set may be configured with a new parameter to indicate whether the control resource set supports enhanced PDCCH or not. If a control resource set is indicated to support enhanced PDDCH monitoring, the UE 115 may then monitor that control resource set (e.g., and its associated search spaces) based on the techniques, parameters, and constraints of enhanced PDCCH monitoring. Generally, the techniques for enhanced PDCCH monitoring may provide improved decoding performance for UEs 115 which support low latency communications.

The UE 115 may report a baseline UE capability and an enhanced UE capability. For example, the baseline UE capability may indicate a number of cells the UE 115 can support for baseline PDCCH monitoring, and the enhanced UE capability may indicate a number of cells the UE 115 can support for enhanced PDCCH monitoring. The UE 115 may also report a number of control resource sets and a number of search spaces that the UE supports for enhanced PDCCH monitoring on a cell, a number of DCI sizes that support the enhanced monitoring, and control channel element and blind decoding limits per monitoring span under the enhanced PDCCH monitoring.

Figure 2:
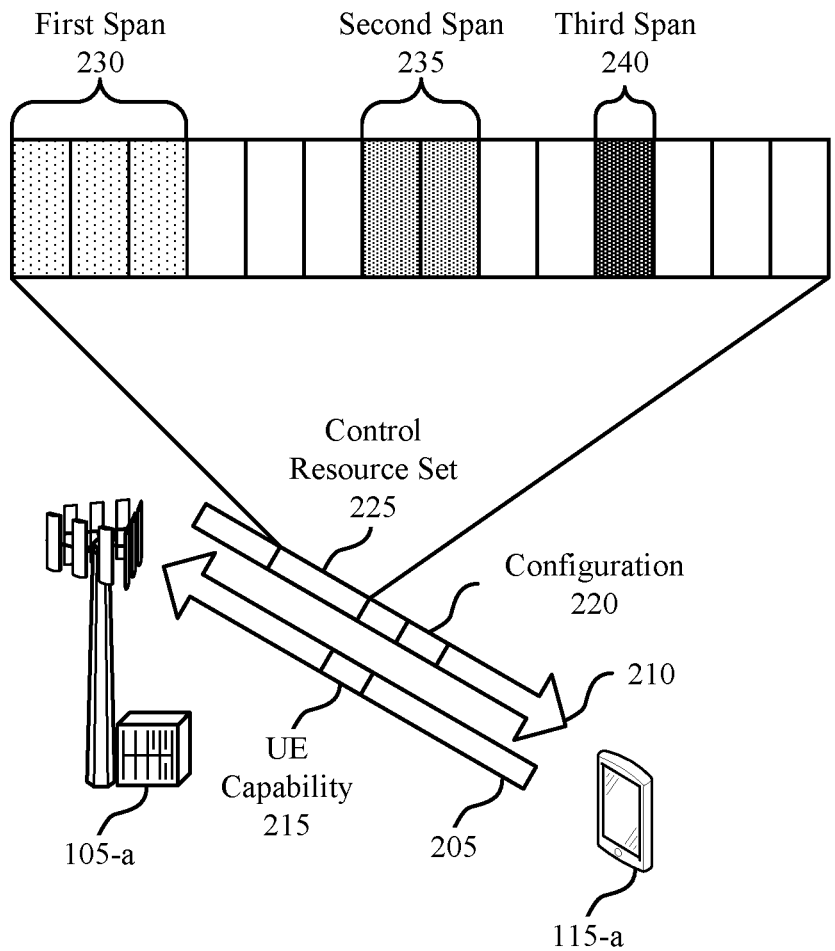
FIG. 2 illustrates an example of a wireless communications system that supports downlink control channel monitoring capability for ultra-reliable low-latency communications in accordance with aspects of the present disclosure.

FIG. 2 illustrates an example of a wireless communications system 200 that supports downlink control channel monitoring capability for ultra-reliable low-latency communications in accordance with aspects of the present disclosure. In some examples, wireless communications system 200 may implement aspects of wireless communication system 100. The wireless communications system 200 may include UE 115-a and base station 105-a, which may be respective examples of a UE 115 and a base station 105 described herein. UE 115-a may be capable of low latency communications, such as ultra-reliable low-latency communications (URLLC), in addition to other communications, such as mobile broadband (MBB) or enhanced MBB (eMBB). UE 115-a may transmit to base station 105-a on an uplink carrier 205, and base station 105-a may transmit to UE 115-a on a downlink carrier 210.

UE 115-a may monitor downlink control channels on a bandwidth part of a serving cell provided by base station 105-a to receive downlink control information. UE 115-a may be configured with a control resource configuration (e.g., a configuration 220), which may set constraints for PDCCH monitoring for UE 115-a. For example, UE 115-a may monitor PDCCH with constraints on a number of control resource sets, a number of search spaces, a DCI size limit, a blind detection limit, a number of non-overlapped CCE limit, and a number of PDCCHs.

In some wireless communications systems, such as some conventional wireless communications systems, some UEs 115 may have certain limits for these constraints. For example, a UE 115 may support up to 3 control resource sets and 10 search space sets in an active bandwidth part on a serving cell configured for the UE 115. In some cases, the UE 115 may have a DCI size limit of up to 3+1 DCI sizes, where at most 3 can be C-RNTI. Generally, some constraints for PDCCH monitoring in conventional wireless communications systems may be set to support eMBB communications.

UE 115-a may be capable of both eMBB and URLLC communications on a same serving cell. Therefore, the wireless communications system 200 may implement techniques to support PDCCH monitoring, and PDCCH monitoring constraints, based on URLLC. For example, UE 115-a may be capable of both a baseline PDCCH monitoring and an enhanced PDCCH monitoring.

In some cases, UE 115-a may have multiple PDCCH monitoring occasions within a single slot. Each PDCCH monitoring occasion may span one or more symbol periods of the slot, and therefore be referred to as a monitoring span. For example, UE 115-a may be configured with a first monitoring span 230, a second monitoring span 235, and a third monitoring span 240. In some cases, UE 115-a may determine the monitoring spans within a slot based on a pre-configured condition or rule. In some examples, UE 115-a may determine the monitoring spans by taking into account all of the control resource sets and search spaces of the serving cell. In some conventional systems, blind decoding and control channel element limits may be applied regardless of whether UE 115-a supports the frequent monitoring (e.g., with multiple spans) or not (e.g., just a baseline, one PDCCH monitoring occasion).

In some cases, UE 115-a may support performing an increased number of blind decodings, monitoring an increased number of control channel elements per slot, or both. In some cases, the configuration to perform an increased number of blind decodings and monitor control channel elements per slot may be referred to as enhanced PDCCH monitoring. For example, some UEs 115 may support monitoring 56 control channel elements per slot, where UE 115-a may support monitoring 56 control channel elements per monitoring span. UE 115-a may be configured for enhanced PDCCH monitoring on some control resource sets, search spaces, or both, and UE 115-a may be configured for enhanced PDCCH monitoring on some control resource sets, search spaces, or both.

UE 115-a may indicate to base station 105-a that UE 115-a is capable of supporting enhanced PDCCH monitoring. UE 115-a may report its capability to base station 105-a via a UE capability 215. The UE capability 215 may be transmitted or indicated when an RRC connection or RRC configuration is established. Base station 105-a may transmit a configuration 220 to UE 115-a for the enhanced downlink control channel monitoring. The configuration 220 may indicate that a control resource set, or one or more search spaces, or both, are configured for the enhanced PDCCH monitoring. The configuration 220 may also include indicators of various configurations or constraints for the enhanced PDCCH monitoring.

In some cases, UE 115-a may report its capability of a number of component carriers UE 115-a can support for baseline PDCCH blind detection. In some cases, the number of component carriers may be referred to as $N_{cell}^{cap}$, and the capability may be indicated via a parameter "pdcch-BlindDetectionCA" or "pdcch-BlindDetectionCA-baseline." In some cases, $N_{cell}^{cap}$ may be reported for PDCCH blind decoding and control channel element computation. For example, the number of configured PDCCH blind decodings to be performed and the number of configured control channel elements to be monitored may be based on $N_{cell}^{cap}$.

In some cases, a number of configured cells for UE 115-a may be different from the number of cells indicated by the capability parameter. For example, UE 115-a may be configured with fewer cells or more cells than the indicated capability. If UE 115-a is configured with fewer or equal component carriers than the indicated number, then the single-cell blind decoding and control channel element limits may be applied to each configured cell. If UE 115-a is configured with more component carriers than the indicated capability, then the blind decoding and control channel element limits may each be proportionally distributed to each configured component carriers. For example, the limits may be distributed among the component carriers based on Equation (1) below, where μ denotes subcarrier spacing, and $M_{PDCCH}^{max,slot,\mu}$ denotes the single-cell blind decoding limit for the given subcarrier spacing. The blind decoding limit may be defined by Equation (2) below. Generally, the number of blind decodings may be evenly distributed across the component carriers of the same subcarrier spacing and proportionally distributed among component carriers of different subcarrier spacings.

$$M_{PDCCH}^{total,slot,\mu} = \left\lfloor N_{cell}^{cap} \cdot M_{PDCCH}^{max,slot,\mu} \cdot \frac{N_{cells}^{DL,\mu}}{N_{cells}^{total}} \right\rfloor \quad (1)$$

$$M_{PDCCH}^{limit} = \min\{M_{PDCCH}^{total,slot,\mu}, M_{PDCCH}^{max,slot,\mu}\} \quad (2)$$

In some cases, base station 105-a may configure more control channel elements or blind decodings, or both, than the indicated capabilities of UE 115-a. This may be referred to as overbooking. Extra blind decodings and control channel elements may be dropped once the processed blind decodings and control channel elements reach the UE's processing limit. In some cases, the dropping may be based on a configure dropping rule. In some cases, overbooking may be supported on the primary cell, but not on the secondary cells. In some cases, overbooking may not be supported for a common search space (e.g., the common search space may not exceed the control channel element or blind decoding limits).

In some carrier aggregation schemes, there may be a limit to a number of scheduling DCIs UE 115-a stores in memory. In some examples, UE 115-a may not expect to receive more than 16 times the indicated capability of supported component carriers (e.g., $16 * N_{cell}^{cap}$) PDCCHs for which UE 115-a has not yet received a PDSCH symbol.

UE 115-a may include a capability for enhanced PDCCH monitoring (e.g., an enhanced PDCCH monitoring capability). For example, UE 115-a may, via the UE capability 215, indicate a number of cells supported for baseline PDCCH monitoring and a number of cells supported with enhanced PDCCH monitoring. In some cases, the enhanced PDCCH monitoring capability may be indicated via a parameter such as "pdcch-BlindDetectionCA-enhanced." For example, UE 115-a may indicate a support for two cells for baseline PDCCH monitoring and two for enhanced PDCCH monitoring.

For each serving cell, base station 105-a may configure UE 115-a for whether enhanced PDCCH monitoring is enabled or not. For example, in some cells, base station 105-a may configure that enhanced PDCCH monitoring is enabled, where enhanced PDCCH monitoring may not be enabled for other cells. In some cases, by default, only baseline PDCCH monitoring may be configured. The number of cells configured with enhanced PDCCH monitoring may, in some cases, be larger than the reported capability in the enhanced PDCCH monitoring capability. In this example, the blind decoding and CCE limits with enhanced monitoring may be determined (e.g., computed) by uniformly distributing the total limits across the number of configured cells.

In some examples, UE 115-a may report two different processing time capabilities. For example, UE 115-a may report first processing time capability (e.g., "Cap1") and a second processing time capability (e.g., "Cap2") to base station 105-a. In some cases, Cap2 may use faster processing than Cap1. Base station 105-a may determine whether a downlink cell follows Cap1 or Cap2. In some cases, enhanced PDCCH monitoring may be enabled on a serving cell based on the Cap2 processing time being enabled on the serving cell. In some examples, Cap1 may correspond to a processing time for eMBB, and Cap2 may correspond to a processing time for some low latency communications, such as URLLC. UE 115-a may support reporting its capability of a first number of cells, X1, UE 115-a can support under Cap1 and a second number of cells, X2, UE 115-a can support under Cap2, respectively. On a physical cell, UE 115-*a* may be configured to support just Cap1, just Cap2, or both Cap1 and Cap2 based on a capability of UE 115-*a*. In an example, if UE 115-*a* is capable of supporting both Cap1 and Cap2 on a physical cell, UE 115-*a* may then be able to receive and process both eMBB and low latency (e.g., URLLC) traffic (e.g., at the same time).

Additionally, or alternatively, enhanced PDCCH monitoring may be enabled on a cell even if the cell supports the Cap1 processing time. For example, the enhanced PDCCH monitoring may have some additional conditions based on the serving cell only supporting the Cap1 processing time. For example, there may be a maximum numbering of monitoring spans per slot (e.g., two monitoring spans per slot). In some cases, the number of cells reported may correspond to, or be aligned with, the UE processing time capability. For example, the enhanced PDCCH monitoring parameter, "pdcch-BlindDetectionCA-enhanced," may be less than or equal to the number of cells which support the Cap2 processing time.

In some examples, UE 115-*a* may report additional parameters or capabilities in the UE capability 215. For example, UE 115-*a* may report a number of control resource sets, a number of search spaces, or both, that UE 115-*a* supports to follow the enhanced monitoring behavior on a cell. In some cases, UE 115-*a* may report a number of DCI sizes that follow the enhanced PDCCH monitoring capability. In some examples, UE 115-*a* may report a number of CCEs (e.g., a limiting number of CCEs), a number of blind decoding (e.g., a limiting number of blind decodings), or both, which UE 115-*a* supports per monitoring span for the enhanced PDCCH monitoring.

In some cases, PDCCH limits may be separately considered for low latency communications (e.g., URLLC) and non-low latency communications (e.g., eMBB) on the same cell. The processing powers may not be dynamically shared between URLLC and eMBB. For example, UE 115-*a* may indicate a capability of X control resource sets and Y search spaces with enhanced PDCCH monitoring behavior. In this example, UE 115-*a* may support a total of up to 3 configured eMBB control resource sets and up to 10 configured eMBB search spaces. According to these parameters, UE 115-*a* may also support up to X configured URLLC control resource sets and up to Y configured URLLC search spaces.

In some examples, search space sharing between enhanced monitoring (e.g., based on URLLC) and baseline monitoring (e.g., based on eMBB) on the same cell or on different cells may not be allowed. Therefore, UE 115-*a* may not expect to decode an eMBB DCI in a search space that is configured with the enhanced monitoring, and vice versa.

Similarly, if UE 115-*a* indicates X as a limiting number of CCEs and Y as a limiting number of blind decodings supported per monitoring span with the enhanced PDCCH monitoring capability. In this example, UE 115-*a* may support up to 56 CCEs for eMBB PDCCH and up to 44 blind decodings for eMBB PDCCH, given an SCS of 30 kHz. UE 115-*a* may support up to X control channel elements for URLLC and up to Y blind decodings for URLLC.

In some cases, each control resource set may be configured with a new parameter (e.g., an enhanced PDCCH monitoring parameter) whether the control resource set is configured for the enhanced PDCCH monitoring or just the baseline PDCCH monitoring. In some cases, each control resource set may use one monitoring behavior at a time. For example, a control resource set may be configured for baseline PDCCH monitoring or enhanced PDCCH monitoring.

In some examples, a capability or configuration for PDCCH monitoring in a search space (e.g., enhanced PDCCH monitoring or baseline PDCCH monitoring) may be determined based on an associated control resource set of the search space. For example, a control resource set may include one or more search spaces. If the control resource set is configured for enhanced PDCCH monitoring, then each search space associated with that control resource set may also be configured for enhanced PDCCH monitoring. In some examples, DCI size, CCE, and blind decoding limits may be based on a number of search spaces with the enhanced capability. For example, the DCI size, CCE, and blind decoding limits may be configured based on the number of search spaces configured for enhanced PDCCH monitoring across all configured control resource sets for UE 115-*a*.

In an example, UE 115-*a* may receive a configuration for a serving cell. The configuration may indicate that the downlink serving cell is configured for enhanced downlink control channel monitoring. UE 115-*a* may determine that each control resource set, each search space, or each of both, may be configured for enhanced downlink control channel monitoring on the serving cell.

In some cases, overbooking may be applied for enhanced PDCCH monitoring. For example, UE 115 *a* may be configured with both baseline PDCCH monitoring and enhanced PDCCH monitoring on a primary cell (e.g., via a control resource set configuration). In some cases, overbooking may be supported for the control resource sets or search spaces with baseline PDCCH monitoring. For example, UE 115 *a* may not expect overbooking (e.g., and hence dropping) for control resource sets or search spaces configured for enhanced PDCCH monitoring. Computing blind decoding and control channel element limits and the dropping determination may have high complexity or take significant processing time. If UE 115 *a* determines (e.g., computes) the dropping rule for each monitoring span with enhanced PDCCH monitoring, it may be difficult for UE 115 *a* to meet the shorter processing time. Therefore, UE 115 *a* may not expect to be configured with search space sets with enhanced PDCCH monitoring that results to a corresponding total or per-scheduled cell, number of monitored PDCCH candidates and non-overlapped CCEs per monitoring span that exceed the corresponding maximum number per monitoring span.

In some cases, in the first monitoring span 230, there may be more PDCCH candidates that UE 115-*a* monitors. For example, there may often be both a common search space and a UE-specific search space in the first monitoring span 230. In other monitoring spans, UE 115-*a* may only monitor a specific type of DCI (e.g., only URLLC DCI). Therefore, if all spans have the same processing limit (e.g., BD/CCE limit), then the base station may configure more blind decodings and control channel elements for UE 115-*a* to monitor in the first monitoring span than supported by the processing limit of UE 115-*a*, thus resulting in overbooking.

In some cases, each control resource set and search space on a primary cell may be configured for enhanced PDCCH monitoring. Then, overbooking may be supported based on a set of constraints. In a first example, overbooking may be supported on only a first monitoring span of the slot (e.g., the first monitoring span 230).

In a second example, overbooking may be supported in monitoring spans that contain both one or more common search spaces and one or more UE-specific search spaces. For example, overbooking may not be supported for monitoring spans that only contain UE-specific search spaces or only contain common search spaces (e.g., and not search spaces of both types). In some cases, the second example may be slot-dependent. For example, if the periodicity of a common search space is greater than one slot (e.g., the common search space does not occur in each slot), then the common search space may not occur in each slot. In some cases, overbooking may not be expected (e.g., by UE 115-a or by base station 105-a) for slots without both the common search space and the UE-specific search space. In some cases, overbooking may only be used for monitoring spans that contain common search spaces, and there may not be overbooking for monitoring spans that contain only UE-specific search spaces.

UE 115-a may implement techniques to determine the PDCCH monitoring spans. For example, when UE 115-a determines a PDCCH monitoring span, UE 115-a may take into consideration the search spaces and control resource sets which are configured with enhanced PDCCH monitoring. Therefore, UE 115-a may not just consider all search spaces when determining the monitoring span. For example, in some cases, UE 115-a may not consider search spaces configured for baseline PDCCH monitoring. Or, in some examples, UE 115-a may consider all control resource sets and search spaces (e.g., configured for baseline or enhanced PDCCH monitoring) to identify the monitoring spans.

In some examples, in the same or different search spaces, there may be a minimum time separation of X OFDM symbols (e.g., including the cross-slot boundary case) between the start of two monitoring spans, where each monitoring span may be of length up to Y consecutive symbols of a slot. In some cases, monitoring spans may not overlap. Each monitoring span may be contained within a single slot, where the same span pattern may be used for multiple slots. The separation between two consecutive spans within and across slots may be unequal, but the same X and Y parameters may be satisfied for each span. Each monitoring occasion may be fully contained in one span. To determine a suitable span pattern, a first bitmap b(I), 0≤I≤13 may be generated, where b(I)=1 if symbol I of any slot is part of a monitoring occasion, and b(I)=0 otherwise. The first span in a span pattern may begin at the smallest I for which b(I)=1. The next span in the span pattern may begin at the smallest I not included in the previous spans for which b(I)=1. The span duration may be equal to the larger of a maximum value of all control resource set durations and a minimum value of Y in the UE reported candidate value. In some cases, the next span in the pattern may be determined as described above except for some cases where the last span in a slot is of a shorter duration. In some cases, a PDCCH monitoring configuration may meet the UE capability limitation if the span arrangement satisfies the gap separation for at least one X and Y in the UE reported candidate value set in each slot, including a cross-slot boundary.

In some cases, UE 115-a may separate eMBB and URLLC processing on the same cell into different virtual cells. By using virtual cells, UE 115-a may support two virtual cells in carrier aggregation, where one cell is used to receive eMBB and one cell is used to receive URLLC. In this example, the techniques for using virtual cells may be similar to those without virtual cells, but the two virtual cells may be operated on the same physical cell resources.

Figure 3:
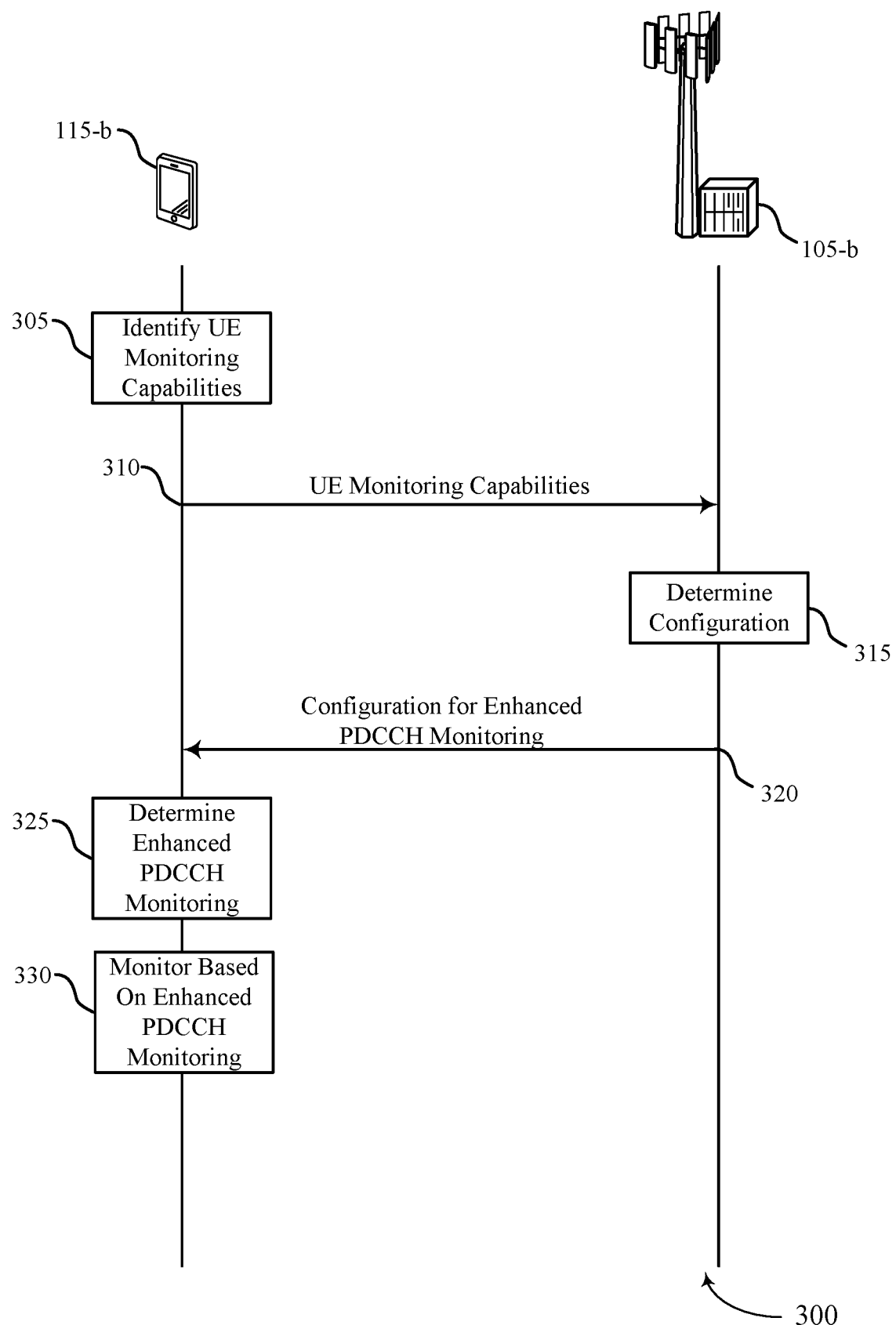
FIG. 3 illustrates an example of a process flow that supports downlink control channel monitoring capability for ultra-reliable low-latency communications in accordance with aspects of the present disclosure.

FIG. 3 illustrates an example of a process flow 300 that supports downlink control channel monitoring capability for ultra-reliable low-latency communications in accordance with aspects of the present disclosure. In some examples, process flow 300 may implement aspects of wireless communication system 100. The process flow 300 may include UE 115-b and base station 105-b, which may be respective examples of a UE 115 and a base station 105 described herein.

At 305, UE 115-b may identify a baseline downlink control channel monitoring capability of UE 115-b and an enhanced downlink control channel monitoring capability of UE 115-b, where the enhanced downlink control channel monitoring capability facilitates monitoring by UE 115-b of more downlink control channel monitoring opportunities per slot than the baseline downlink control channel monitoring capability. For example, UE 115-b may be capable of performing an increased number of blind decodings or capable of monitoring an increased number of control channel elements compared to baseline downlink control channel monitoring techniques.

At 310 UE 115 b may report, to base station 105 b, the enhanced downlink control channel monitoring capability. In some cases, UE 115-b may report the baseline downlink control channel monitoring capability. In some cases, UE 115 b may report a first number of cells for which UE 115 b supports the enhanced downlink control channel monitoring and a second number of cells for which UE 115 b supports the baseline downlink control channel monitoring. In some examples, the first number of cells may be less than or equal to the number of cells for which UE 115 b supports a shorter of two different minimum downlink processing times. The two different downlink processing times may correspond to, for example, Cap1 and Cap2 as described herein.

In some cases, UE 115-b may report control resource set or search space limits supported by UE 115-b that correspond with a number of control resource sets per cell or a number of search spaces per cell UE 115-b is capable of supporting with the enhanced downlink control channel monitoring. In some cases, UE 115-b may report a number of downlink control information sizes supported by UE 115-b for the enhanced downlink control channel monitoring capability. In some examples, UE 115-b may report a per downlink control channel monitoring span blind decoding limit or a per downlink control channel monitoring span control channel element processing limit supported by UE 115-b that corresponds with the enhanced downlink control channel monitoring capability.

In some cases, UE 115-b may report, to base station 105-b, a per downlink control channel monitoring span blind decoding limit or a per downlink control channel monitoring span control channel element processing limit supported by UE 115-b that corresponds with the enhanced downlink control channel monitoring capability. In some cases, the total number of blind decodings or control channel element processing across each of the configured monitoring spans may be greater than the blind decoding limit and control channel element processing limit of the baseline downlink control channel monitoring capability.

At 315, base station 105-b may determine a configuration for enhanced downlink control channel monitoring based on the reported capabilities. At 320, UE 115-b may receive, based on UE 115-b reporting the enhanced downlink control channel monitoring capability, a configuration for enhanced downlink control channel monitoring. UE 115-b may determine that the received configuration configures enhanced downlink control channel monitoring on a serving cell. For example, each control resource set and search space on the serving cell may be associated with or configured for the enhanced downlink control channel monitoring.

In some cases, UE 115-b may receive at least one control resource set configuration that includes an indication that a corresponding control resource set is configured for enhanced downlink control channel monitoring. In some examples, UE 115-*b* may receive a first search space configuration for a first search space of a set of search spaces associated with a control resource set, where the first search space configuration indicates that the first search space is configured for enhanced downlink control channel monitoring, and UE 115-*b* may receive a second search space configuration for a second search space of the set of search spaces associated with the control resource set, where the second search space configuration indicates that the second search space is configured for baseline downlink control channel monitoring.

At 325 UE 115-*b* may determine the enhanced PDCCH monitoring configuration based on the received configuration. At 330, UE 115-*b* may monitor one or more downlink control channels in accordance with the enhanced downlink control channel monitoring capability of UE 115-*b*. In some cases, UE 115-*b* may apply a downlink control information size limit, a per downlink control channel monitoring span blind decoding limit, or a per downlink control channel monitoring span control channel element processing limit based on a number of search spaces associated with control resource sets configured for enhanced downlink control channel monitoring and a set of downlink control channel candidates, associated with the search spaces, corresponding to the enhanced downlink control channel monitoring.

Figure 4:
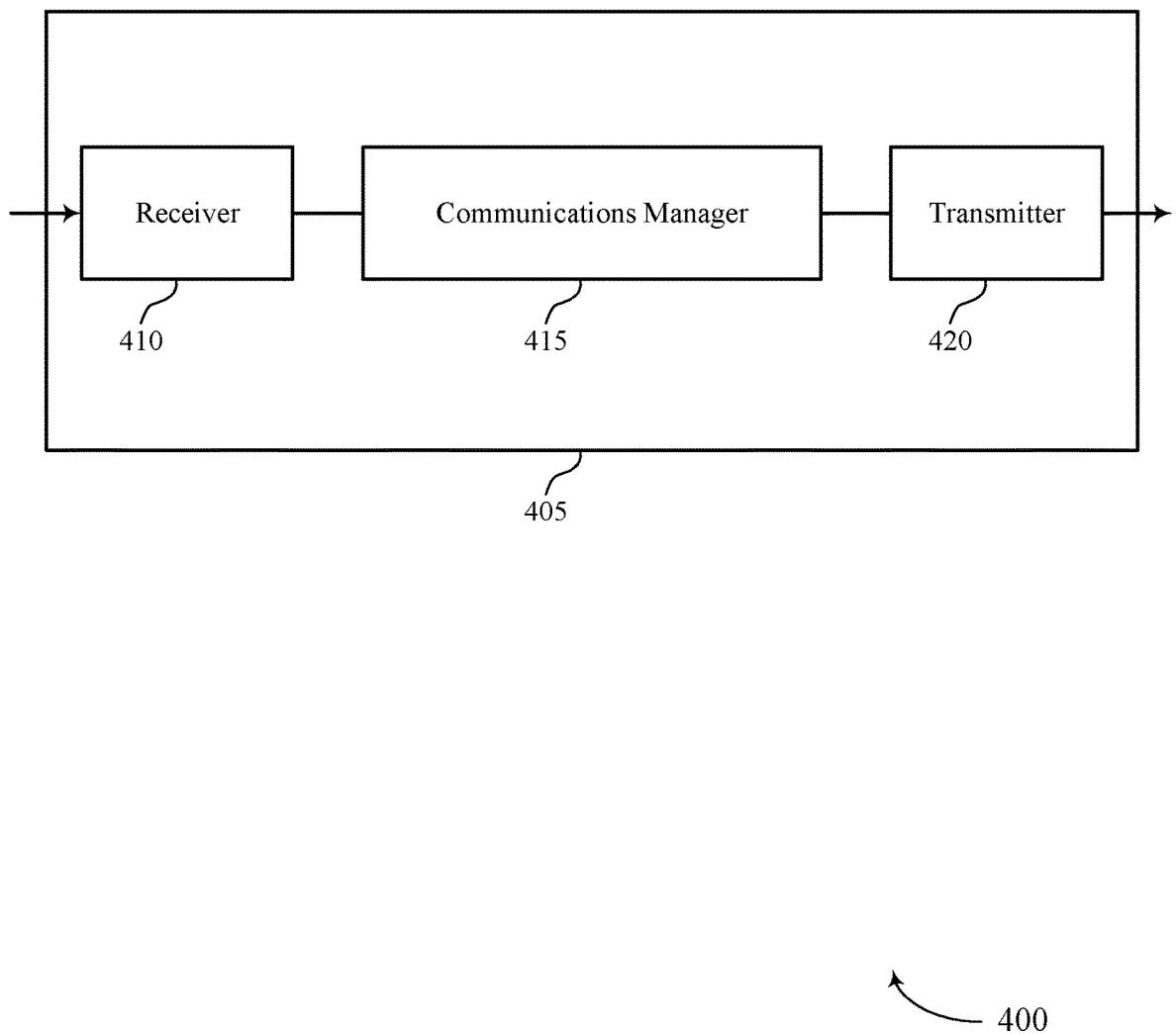
FIGS. 4 and 5 show block diagrams of devices that support downlink control channel monitoring capability for ultra-reliable low-latency communications in accordance with aspects of the present disclosure.

FIG. 4 shows a block diagram 400 of a device 405 that supports downlink control channel monitoring capability for ultra-reliable low-latency communications in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to downlink control channel monitoring capability for ultra-reliable low-latency communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, report, to a base station, the enhanced downlink control channel monitoring capability and also the baseline downlink control channel monitoring capability, receive, based at least on the UE reporting the enhanced downlink control channel monitoring capability, a configuration for enhanced downlink control channel monitoring, and monitor one or more downlink control channels in accordance with the enhanced downlink control channel monitoring capability of the UE. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
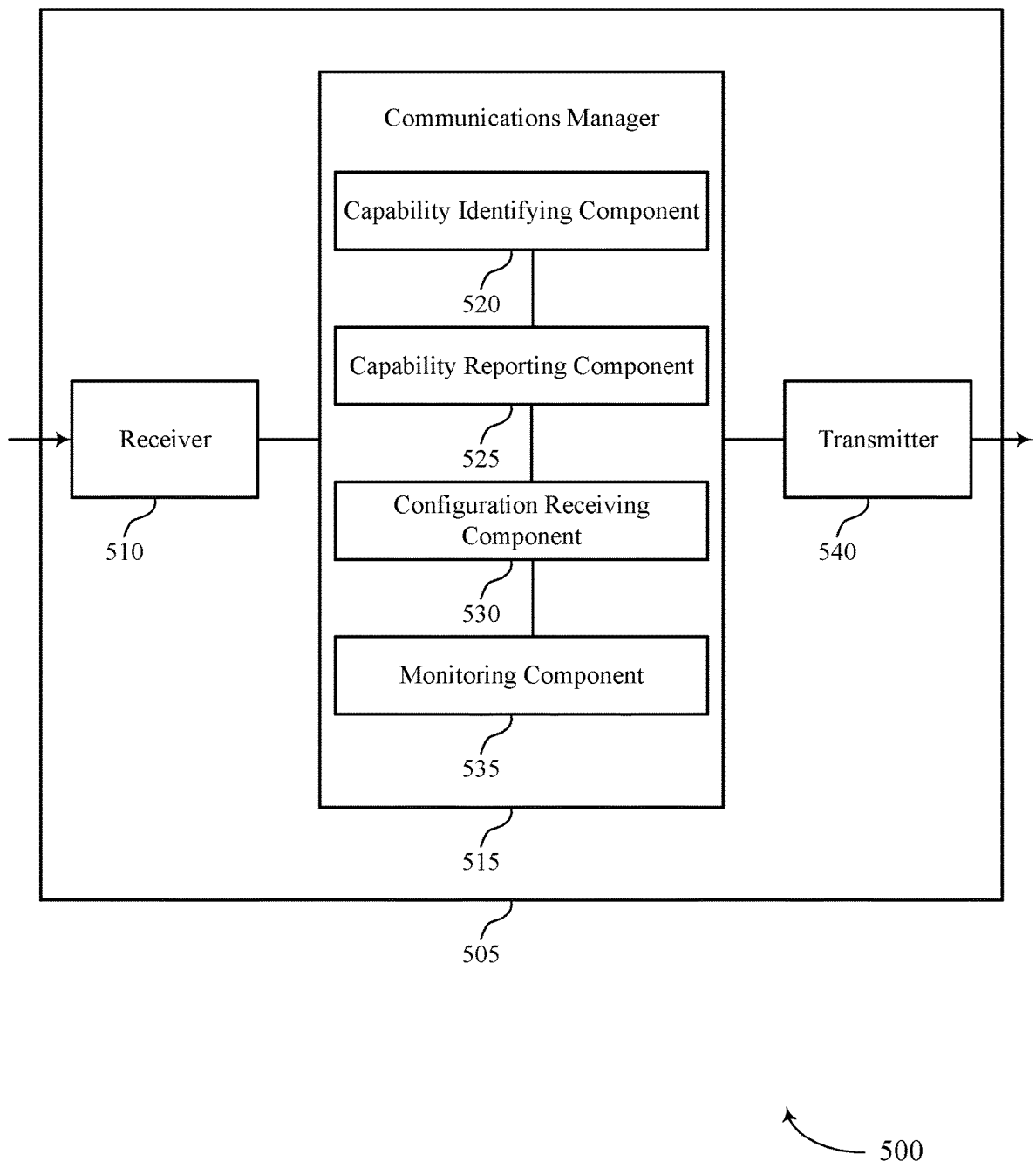

FIG. 5 shows a block diagram 500 of a device 505 that supports downlink control channel monitoring capability for ultra-reliable low-latency communications in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to downlink control channel monitoring capability for ultra-reliable low-latency communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a capability identifying component 520, a capability reporting component 525, a configuration receiving component 530, and a monitoring component 535. The communications manager 515 may be an example of aspects of the communications manager 710 described herein.

The capability identifying component 520 may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability.

The capability reporting component 525 may report, to a base station, the enhanced downlink control channel monitoring capability and also the baseline downlink control channel monitoring capability.

The configuration receiving component 530 may receive, based at least on the UE reporting the enhanced downlink control channel monitoring capability, a configuration for enhanced downlink control channel monitoring.

The monitoring component 535 may monitor one or more downlink control channels in accordance with the enhanced downlink control channel monitoring capability of the UE.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
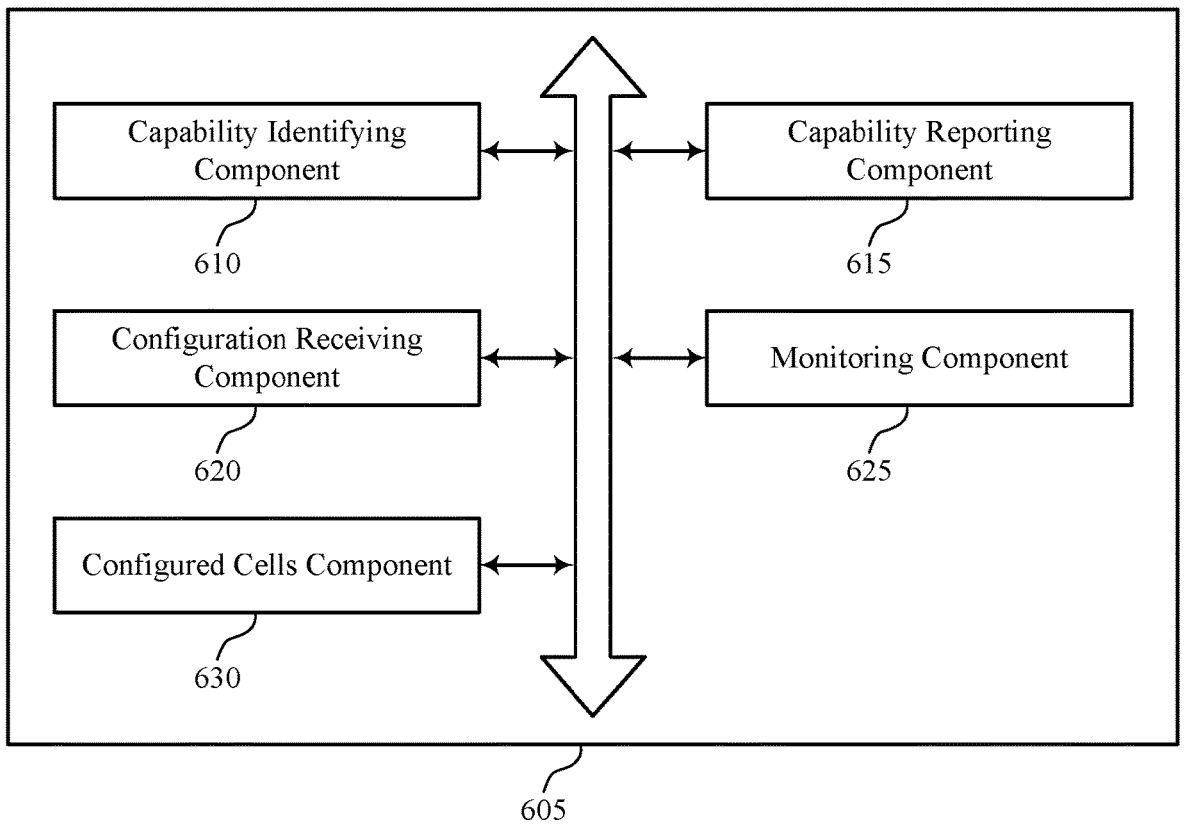
FIG. 6 shows a block diagram of a communications manager that supports downlink control channel monitoring capability for ultra-reliable low-latency communications in accordance with aspects of the present disclosure.

FIG. 6 shows a block diagram 600 of a communications manager 605 that supports downlink control channel monitoring capability for ultra-reliable low-latency communications in accordance with aspects of the present disclosure. The communications manager 605 may be an example of aspects of a communications manager 415, a communications manager 515, or a communications manager 710 described herein. The communications manager 605 may include a capability identifying component 610, a capability reporting component 615, a configuration receiving component 620, a monitoring component 625, and a configured cells component 630. Each of these modules may communicate, directly or indirectly, with one another (e.g., via one or more buses).

The capability identifying component 610 may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability.

The capability reporting component 615 may report, to a base station, the enhanced downlink control channel monitoring capability and also the baseline downlink control channel monitoring capability.

In some examples, the capability reporting component 615 may report a first number of cells for which the UE supports the enhanced downlink control channel monitoring.

In some examples, the capability reporting component 615 may report a second number of cells for which the UE supports the baseline downlink control channel monitoring.

In some examples, the capability reporting component 615 may report, to the base station, control resource set or search space limits supported by the UE that correspond with a number of control resource sets per cell or a number of search spaces per cell the UE is capable of supporting with the enhanced downlink control channel monitoring.

In some examples, the capability reporting component 615 may report, to the base station, a number of downlink control information sizes supported by the UE for the enhanced downlink control channel monitoring capability.

In some examples, the capability reporting component 615 may report, to the base station, a per downlink control channel monitoring span blind decoding limit or a per downlink control channel monitoring span control channel element processing limit supported by the UE that corresponds with the enhanced downlink control channel monitoring capability.

In some cases, the first number of cells is less than or equal to a number of cells for which the UE supports a shorter of two different minimum downlink processing times.

The configuration receiving component 620 may receive, based at least on the UE reporting the enhanced downlink control channel monitoring capability, a configuration for enhanced downlink control channel monitoring.

In some examples, the configuration receiving component 620 may receive at least one control resource set configuration that includes an indication that a corresponding control resource set is configured for enhanced downlink control channel monitoring.

In some examples, the configuration receiving component 620 may receive a first search space configuration for a first search space of a set of search spaces associated with a control resource set, where the first search space configuration indicates that the first search space is configured for enhanced downlink control channel monitoring.

In some examples, the configuration receiving component 620 may receive a second search space configuration for a second search space of the set of search spaces associated with the control resource set, where the second search space configuration indicates that the second search space is configured for baseline downlink control channel monitoring.

In some examples, the configuration receiving component 620 may receive a control resource set configuration for each of a set of serving cells with which the UE communicates, where each control resource set configuration identifies whether a respective serving cell is configured for enhanced downlink control channel monitoring, baseline downlink control channel monitoring, or both.

In some examples, the configuration receiving component 620 may receive a set of control resource set configurations, each for a corresponding control resource set, where a first portion of the corresponding control resource sets are configured for enhanced downlink control channel monitoring and a second portion of the corresponding control resource sets are configured for baseline downlink control channel monitoring.

In some examples, the configuration receiving component 620 may receive search space configurations, configured for enhanced downlink control channel monitoring, which result in overbooking of downlink control channel candidates to be monitored or non-overlapping control channel elements to be processed, where the search space configurations are associated with only the second portion of the corresponding control resource sets.

In some examples, the configuration receiving component 620 may receive a set of control resource set configurations, each for a corresponding control resource set, where each of the corresponding control resource sets are configured for enhanced downlink control channel monitoring.

In some examples, the set of control resource set configurations may be configured for a primary cell.

In some examples, the configuration receiving component 620 may receive search space configurations which result in overbooking of downlink control channel candidates to be monitored or non-overlapping control channel elements to be processed, where the overbooking of downlink control channel candidates occurs only in a first downlink control channel monitoring span of a slot.

In some examples, the configuration receiving component 620 may drop lower priority downlink control channel candidates associated with the first downlink control channel monitoring span based on the overbooking.

In some examples, the configuration receiving component 620 may receive a set of search space configurations, each for a corresponding search space on a primary cell, where each of the corresponding search spaces are configured for enhanced downlink control channel monitoring. In some cases, the set of search space configurations result in overbooking of downlink control channel candidates to be monitored or non-overlapping control channel elements to be processed, where the overbooking of downlink control channel candidates occurs only in a first downlink control channel monitoring span of a slot.

In some examples, the configuration receiving component 620 may receive search space configurations which result in overbooking of downlink control channel candidates to be monitored or non-overlapping control channel elements to be processed, where the overbooking is associated with only downlink control channel monitoring spans that include common search spaces.

In some cases, the configuration identifies that a respective serving cell is only configured for enhanced downlink control channel monitoring if the respective serving cell is also configured for a shorter of two different minimum downlink processing times.

In some cases, the configuration identifies that a respective serving cell is configured for enhanced downlink control channel monitoring when the respective serving cell is also configured for only a slower of two different minimum downlink processing times only if the respective serving cell is further limited to include fewer than a maximum number of downlink control channel monitoring spans per slot.

In some cases, the search space configurations are further associated with only a portion of slots that include both common search spaces and UE-specific search spaces within the downlink control channel monitoring spans that include common search spaces and UE-specific search spaces.

The monitoring component 625 may monitor one or more downlink control channels in accordance with the enhanced downlink control channel monitoring capability of the UE.

In some examples, the monitoring component 625 may apply downlink control channel limits for enhanced mobile broadband communications and ultra-reliable low-latency communications separately on a same cell.

In some examples, the monitoring component 625 may receive a search space configuration for a search space.

In some examples, the monitoring component 625 may identify, from the search space configuration, whether the search space is associated with either a control resource set configured for enhanced downlink control channel monitoring or a control resource set configured for baseline downlink control channel monitoring.

In some examples, the monitoring component 625 may monitor the search space in accordance with the control resource set with which the search space is associated.

In some examples, the monitoring component 625 may apply a downlink control information size limit, a per downlink control channel monitoring span blind decoding limit, or a per downlink control channel monitoring span control channel element processing limit based on a number of search spaces associated with control resource sets configured for enhanced downlink control channel monitoring and a set of downlink control channel candidates, associated with the search spaces, corresponding to the enhanced downlink control channel monitoring.

In some examples, the monitoring component 625 may determine a downlink control channel monitoring span pattern based only on search spaces or control resource sets that are configured for enhanced downlink control channel monitoring.

In some cases, a control resource set may be configured for either enhanced downlink control channel monitoring or baseline downlink control channel monitoring.

The configured cells component 630 may determine that a number of cells configured for enhanced downlink control channel monitoring exceeds the first number of cells.

In some examples, a number of blind decodings for the enhanced downlink control channel monitoring may be based on an equal split, or a uniform distribution of a maximum number of blind decodings across a number of cells configured for the enhanced downlink control channel monitoring, and a number of control channel elements for the enhanced downlink control channel monitoring may be based on an equal split, or a uniform distribution, of a maximum number of control channel elements across the number of cells configured for the enhanced downlink control channel monitoring.

In some examples, the configured cells component 630 may identify a per cell maximum number of blind decodings supported by the UE.

In some examples, the configured cells component 630 may determine an overall maximum number of blind decodings supported by the UE by multiplying the per cell maximum number with the first number of cells.

In some examples, the configured cells component 630 may distribute the overall maximum number of blind decodings across the number of cells configured for enhanced downlink control channel monitoring.

In some examples, the configured cells component 630 may identify a per cell maximum number of control channel element processing supported by the UE.

In some examples, the configured cells component 630 may determine an overall maximum number of control channel element processing supported by the UE by multiplying the per cell maximum number with the first number of cells.

In some examples, the configured cells component 630 may distribute the overall maximum number of control channel element processing across the number of cells configured for enhanced downlink control channel monitoring.

In some cases, the overall maximum number of blind decodings is distributed uniformly across the number of cells configured for enhanced downlink control channel monitoring.

In some cases, the overall maximum number of control channel element processing is distributed uniformly across the number of cells configured for enhanced downlink control channel monitoring.

Figure 7:
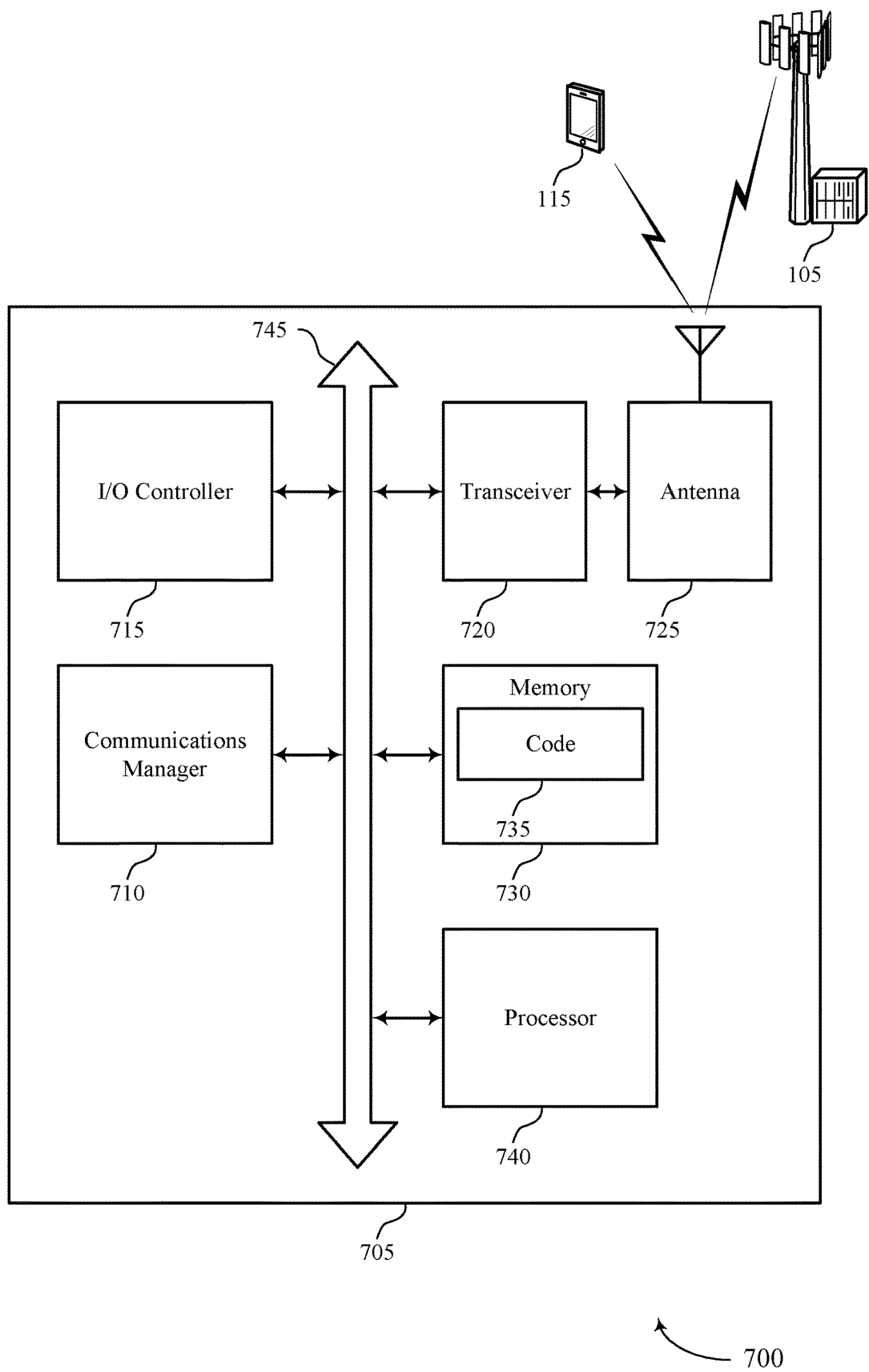
FIG. 7 shows a diagram of a system including a device that supports downlink control channel monitoring capability for ultra-reliable low-latency communications in accordance with aspects of the present disclosure.

FIG. 7 shows a diagram of a system 700 including a device 705 that supports downlink control channel monitoring capability for ultra-reliable low-latency communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, report, to a base station, the enhanced downlink control channel monitoring capability and also the baseline downlink control channel monitoring capability, receive, based at least on the UE reporting the enhanced downlink control channel monitoring capability, a configuration for enhanced downlink control channel monitoring, and monitor one or more downlink control channels in accordance with the enhanced downlink control channel monitoring capability of the UE.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting downlink control channel monitoring capability for ultra-reliable low-latency communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
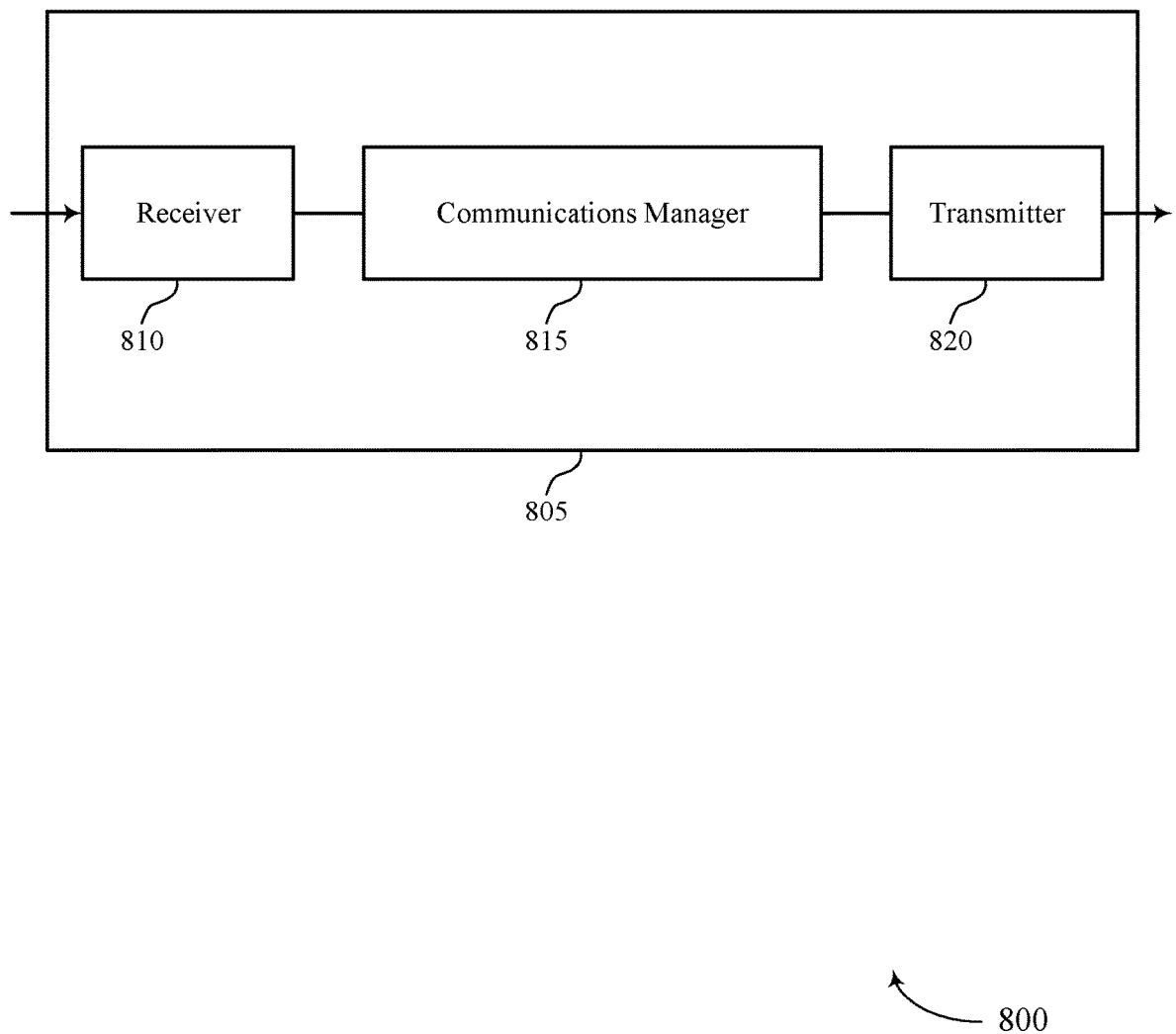
FIGS. 8 and 9 show block diagrams of devices that support downlink control channel monitoring capability for ultra-reliable low-latency communications in accordance with aspects of the present disclosure.

FIG. 8 shows a block diagram 800 of a device 805 that supports downlink control channel monitoring capability for ultra-reliable low-latency communications in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to downlink control channel monitoring capability for ultra-reliable low-latency communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, transmit, to the UE and based at least on receipt of the enhanced downlink control channel monitoring capability of the UE, a configuration for enhanced downlink control channel monitoring, and transmit one or more downlink control channel messages on one or more downlink control channels in accordance with the configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
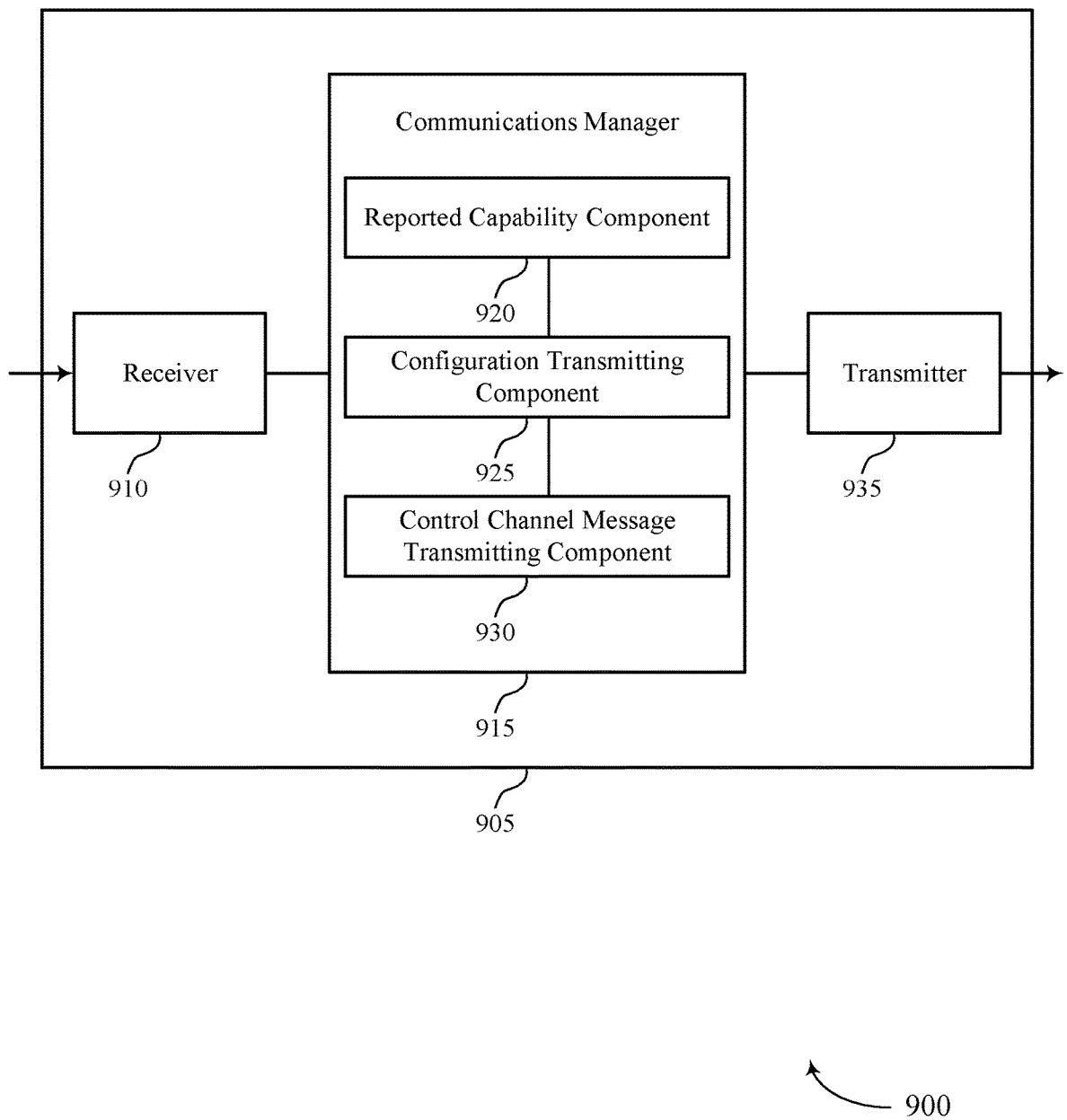

FIG. 9 shows a block diagram 900 of a device 905 that supports downlink control channel monitoring capability for ultra-reliable low-latency communications in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to downlink control channel monitoring capability for ultra-reliable low-latency communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a reported capability component 920, a configuration transmitting component 925, and a control channel message transmitting component 930. The communications manager 915 may be an example of aspects of the communications manager 1110 described herein.

The reported capability component 920 may receive, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability.

The configuration transmitting component 925 may transmit, to the UE and based at least on receipt of the enhanced downlink control channel monitoring capability of the UE, a configuration for enhanced downlink control channel monitoring.

The control channel message transmitting component 930 may transmit one or more downlink control channel messages on one or more downlink control channels in accordance with the configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
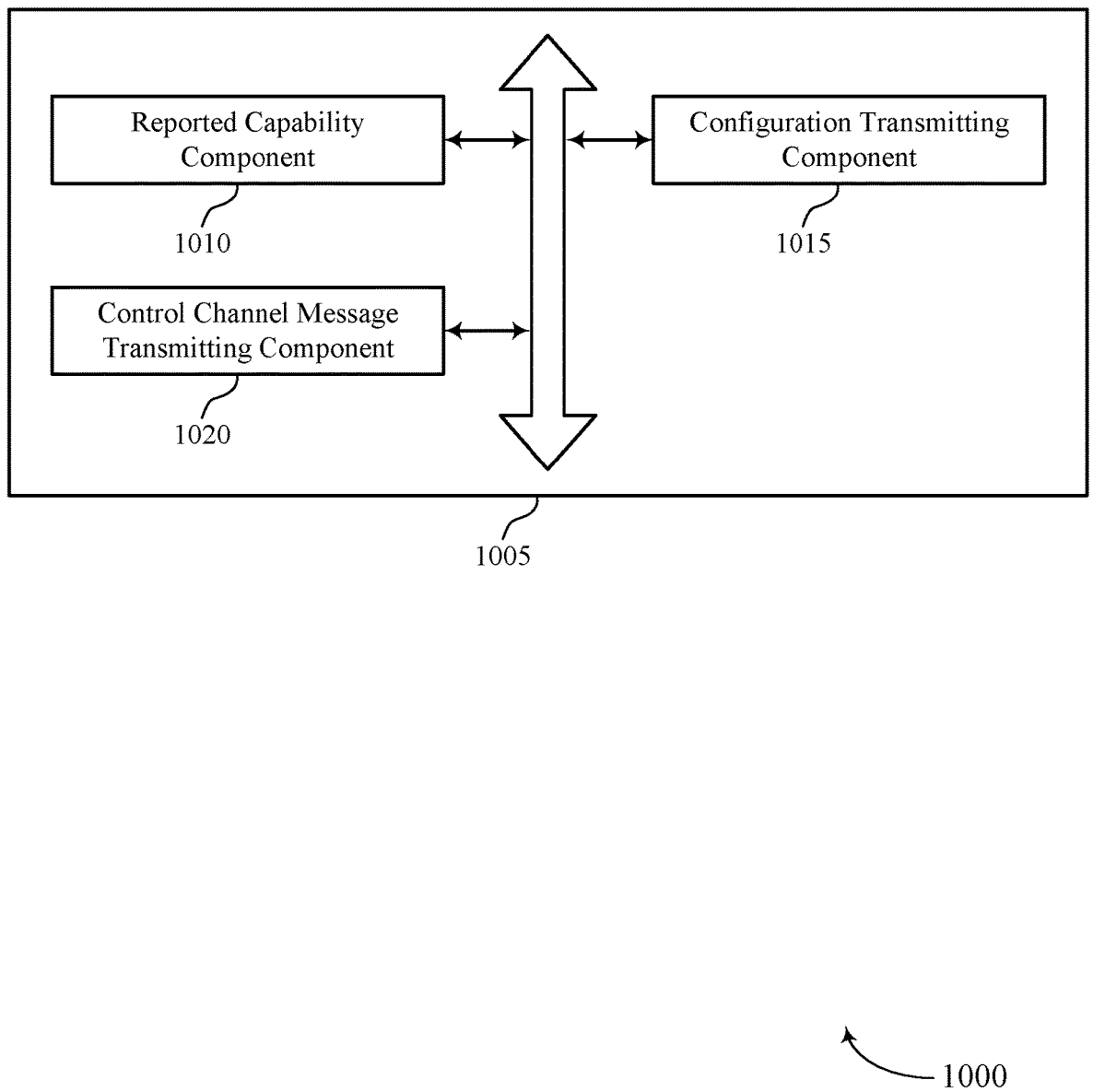
FIG. 10 shows a block diagram of a communications manager that supports downlink control channel monitoring capability for ultra-reliable low-latency communications in accordance with aspects of the present disclosure.

FIG. 10 shows a block diagram 1000 of a communications manager 1005 that supports downlink control channel monitoring capability for ultra-reliable low-latency communications in accordance with aspects of the present disclosure. The communications manager 1005 may be an example of aspects of a communications manager 815, a communications manager 915, or a communications manager 1110 described herein. The communications manager 1005 may include a reported capability component 1010, a configuration transmitting component 1015, and a control channel message transmitting component 1020. Each of these modules may communicate, directly or indirectly, with one another (e.g., via one or more buses).

The reported capability component 1010 may receive, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability.

In some examples, the reported capability component 1010 may receive a first number of cells for which the UE supports the enhanced downlink control channel monitoring.

In some examples, the reported capability component 1010 may receive a second number of cells for which the UE supports the baseline downlink control channel monitoring.

In some examples, the reported capability component 1010 may receive, from the UE, control resource set or search space limits supported by the UE that correspond with a number of control resource sets per cell or a number of search spaces per cell the UE is capable of supporting with the enhanced downlink control channel monitoring.

In some examples, the reported capability component 1010 may receive, from the UE, a number of downlink control information sizes supported by the UE for the enhanced downlink control channel monitoring capability.

In some examples, the reported capability component 1010 may receive, from the UE, a per downlink control channel monitoring span blind decoding limit or a per downlink control channel monitoring span control channel element processing limit supported by the UE that corresponds with the enhanced downlink control channel monitoring capability.

In some cases, the first number of cells may be less than or equal to a number of cells for which the UE supports a shorter of two different minimum downlink processing times.

The configuration transmitting component 1015 may transmit, to the UE and based at least on receipt of the enhanced downlink control channel monitoring capability of the UE, a configuration for enhanced downlink control channel monitoring.

In some examples, the configuration transmitting component 1015 may transmit at least one control resource set configuration that includes an indication that a corresponding control resource set is configured for enhanced downlink control channel monitoring.

In some examples, the configuration transmitting component 1015 may transmit a first search space configuration for a first search space of a set of search spaces associated with a control resource set, where the first search space configuration indicates that the first search space is configured for enhanced downlink control channel monitoring.

In some examples, the configuration transmitting component 1015 may transmit a second search space configuration for a second search space of the set of search spaces associated with the control resource set, where the second search space configuration indicates that the second search space is configured for baseline downlink control channel monitoring.

In some examples, the configuration transmitting component 1015 may transmit a control resource set configuration for each of a set of serving cells with which the base station communicates with the UE, where each control resource set configuration identifies whether a respective serving cell is configured for enhanced downlink control channel monitoring, baseline downlink control channel monitoring, or both.

In some examples, the configuration transmitting component 1015 may transmit a set of control resource set configurations, each for a corresponding control resource set, where a first portion of the corresponding control resource sets are configured for enhanced downlink control channel monitoring and a second portion of the corresponding control resource sets are configured for baseline downlink control channel monitoring.

In some examples, the configuration transmitting component 1015 may transmit search space configurations which result in overbooking of downlink control channel candidates to be monitored or non-overlapping control channel elements to be processed, where the search space configurations are associated with only the second portion of the corresponding control resource sets.

In some examples, the configuration transmitting component 1015 may transmit a set of control resource set configurations, each for a corresponding control resource set, where each of the corresponding control resource sets are configured for enhanced downlink control channel monitoring.

In some examples, the configuration transmitting component 1015 may transmit search space configurations which result in overbooking of downlink control channel candidates to be monitored or non-overlapping control channel elements to be processed, where the overbooking is associated with only in a first downlink control channel monitoring span of a slot.

In some examples, the configuration transmitting component 1015 may drop lower priority downlink control channel candidates associated with the first downlink control channel monitoring span based on the overbooking In some examples, the configuration transmitting component 1015 may transmit search space configurations which result in overbooking of downlink control channel candidates to be monitored or non-overlapping control channel elements to be processed, where the overbooking is associated with only downlink control channel monitoring spans that include common search spaces.

In some cases, the configuration may identify that a respective serving cell is only configured for enhanced downlink control channel monitoring if the respective serving cell is also configured for a shorter of two different minimum downlink processing times.

In some cases, the configuration identifies that a respective serving cell is configured for enhanced downlink control channel monitoring when the respective serving cell is also configured for only a slower of two different minimum downlink processing times only if the respective serving cell is further limited to include fewer than a maximum number of downlink control channel monitoring spans per slot.

In some cases, the search space configurations are further associated with only a portion of slots that include both common search spaces and UE-specific search spaces within the downlink control channel monitoring spans that include common search spaces and UE-specific search spaces.

The control channel message transmitting component 1020 may transmit one or more downlink control channel messages on one or more downlink control channels in accordance with the configuration.

The control channel message transmitting component 1020 may transmit a set of search space configurations, each for a corresponding search space on a primary cell, where each of the corresponding search spaces are configured for enhanced downlink control channel monitoring.

In some examples, the control channel message transmitting component 1020 may transmit a search space configuration for a search space, where the search space configuration indicates whether the search space is associated with either a control resource set configured for enhanced downlink control channel monitoring or a control resource set configured for baseline downlink control channel monitoring.

In some cases, a control resource set may be configured for either enhanced downlink control channel monitoring or baseline downlink control channel monitoring.

Figure 11:
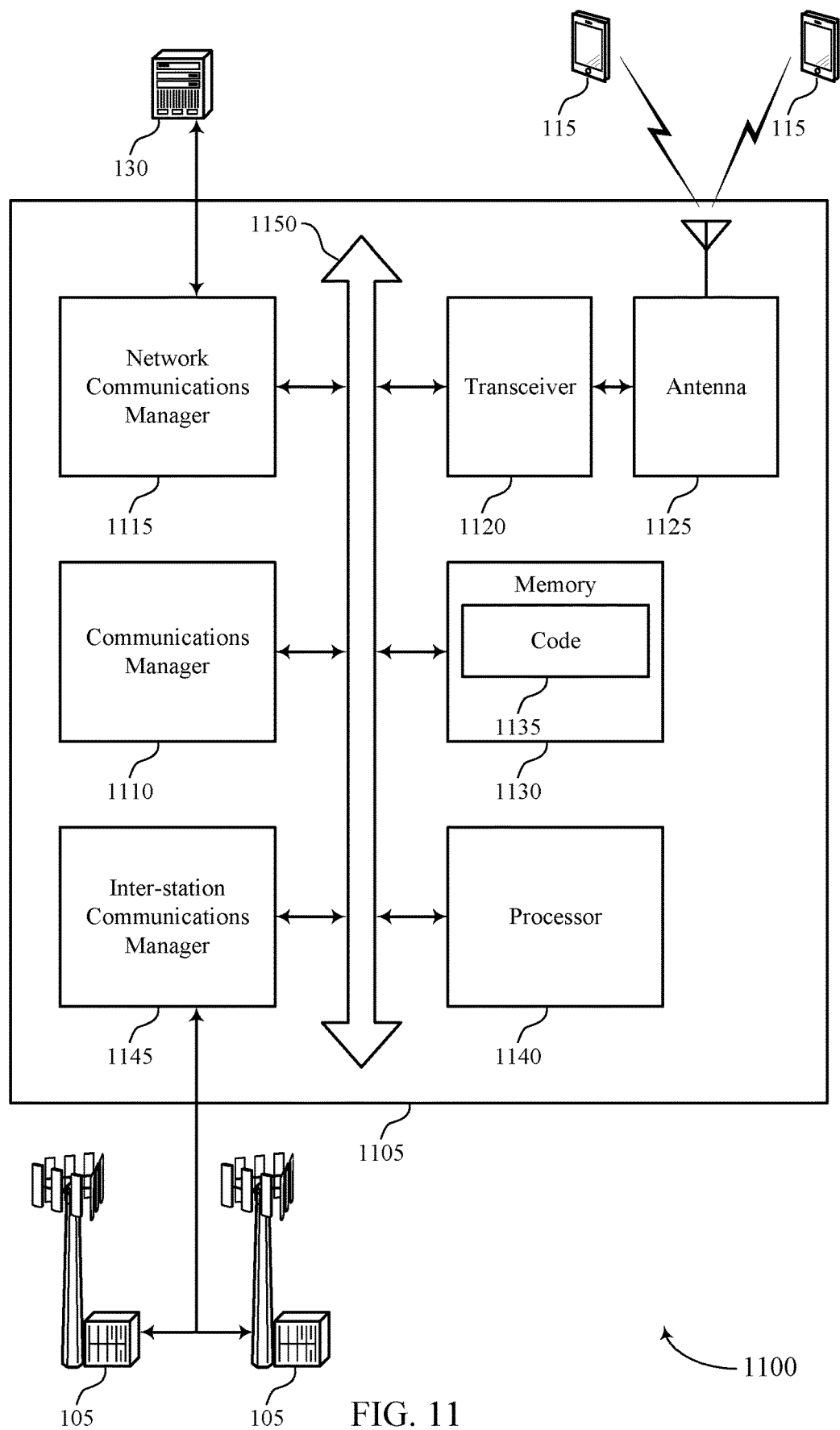
FIG. 11 shows a diagram of a system including a device that supports downlink control channel monitoring capability for ultra-reliable low-latency communications in accordance with aspects of the present disclosure.

FIG. 11 shows a diagram of a system 1100 including a device 1105 that supports downlink control channel monitoring capability for ultra-reliable low-latency communications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a UE, a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability, transmit, to the UE and based at least on receipt of the enhanced downlink control channel monitoring capability of the UE, a configuration for enhanced downlink control channel monitoring, and transmit one or more downlink control channel messages on one or more downlink control channels in accordance with the configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting downlink control channel monitoring capability for ultra-reliable low-latency communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
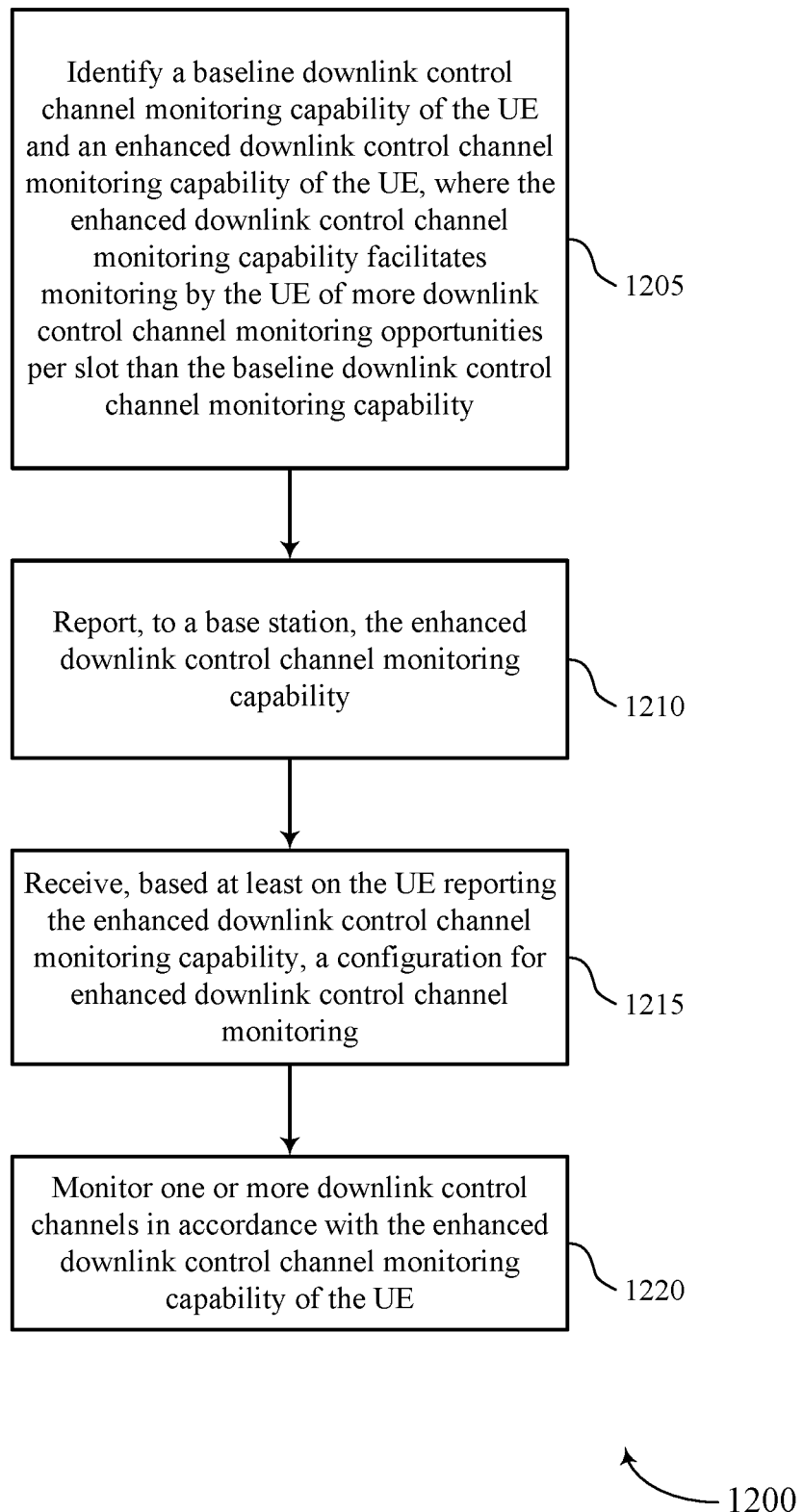
FIGS. 12 through 15 show flowcharts illustrating methods that support downlink control channel monitoring capability for ultra-reliable low-latency communications in accordance with aspects of the present disclosure.

FIG. 12 shows a flowchart illustrating a method 1200 that supports downlink control channel monitoring capability for ultra-reliable low-latency communications in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability. The operations of 1205 may be performed according to the methods described herein. In some examples, aspects of the operations of 1205 may be performed by a capability identifying component as described with reference to FIGS. 4 through 7.

At 1210, the UE may report, to a base station, the enhanced downlink control channel monitoring capability. In some cases, the UE may report the baseline downlink control channel monitoring capability. The operations of 1210 may be performed according to the methods described herein. In some examples, aspects of the operations of 1210 may be performed by a capability reporting component as described with reference to FIGS. 4 through 7.

At 1215, the UE may receive, based at least on the UE reporting the enhanced downlink control channel monitoring capability, a configuration for enhanced downlink control channel monitoring. The operations of 1215 may be performed according to the methods described herein. In some examples, aspects of the operations of 1215 may be performed by a configuration receiving component as described with reference to FIGS. 4 through 7.

At 1220, the UE may monitor one or more downlink control channels in accordance with the enhanced downlink control channel monitoring capability of the UE. The operations of 1220 may be performed according to the methods described herein. In some examples, aspects of the operations of 1220 may be performed by a monitoring component as described with reference to FIGS. 4 through 7.

Figure 13:
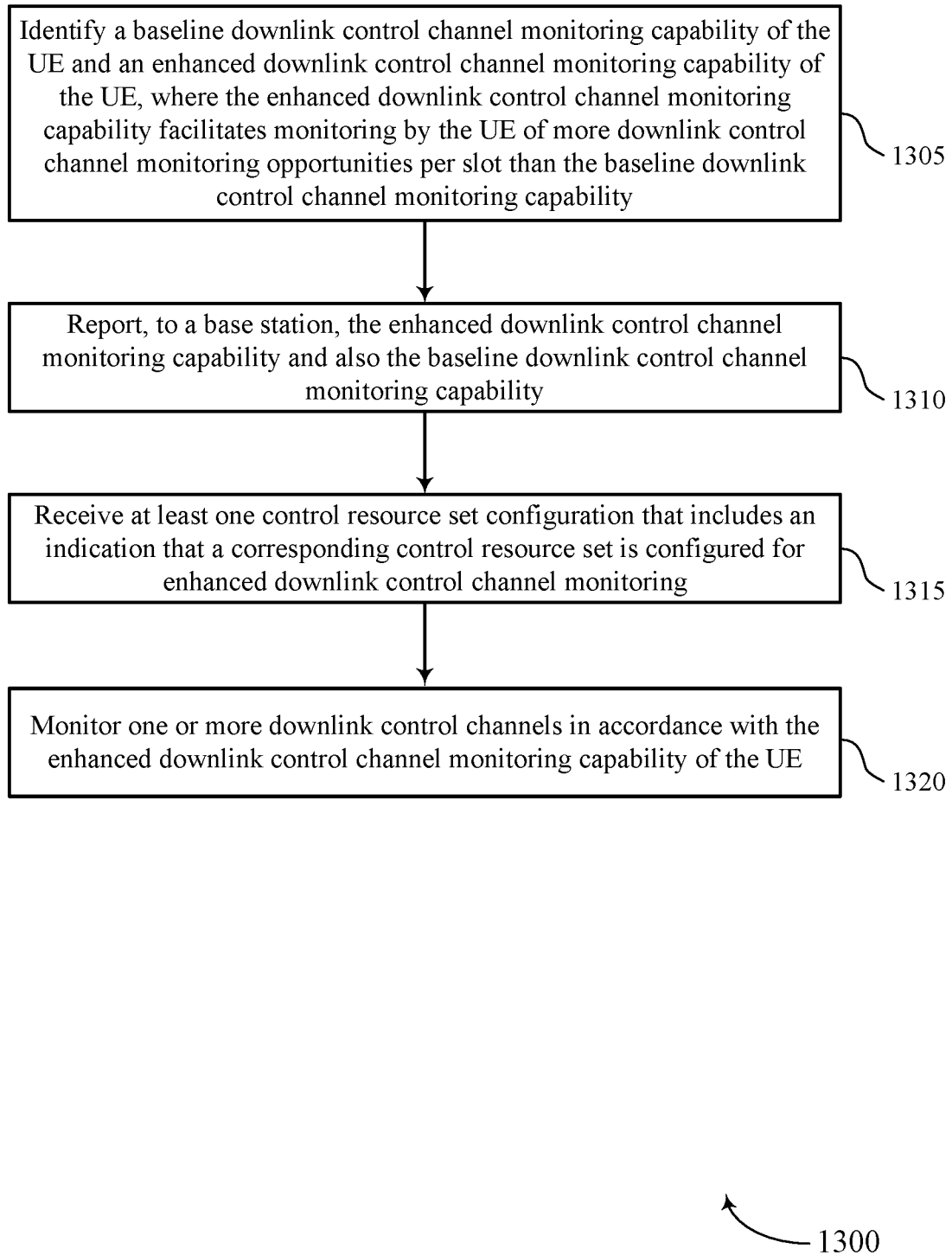

FIG. 13 shows a flowchart illustrating a method 1300 that supports downlink control channel monitoring capability for ultra-reliable low-latency communications in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability. The operations of 1305 may be performed according to the methods described herein. In some examples, aspects of the operations of 1305 may be performed by a capability identifying component as described with reference to FIGS. 4 through 7.

At 1310, the UE may report, to a base station, the enhanced downlink control channel monitoring capability and also the baseline downlink control channel monitoring capability. The operations of 1310 may be performed according to the methods described herein. In some examples, aspects of the operations of 1310 may be performed by a capability reporting component as described with reference to FIGS. 4 through 7.

At 1315, the UE may receive at least one control resource set configuration that includes an indication that a corresponding control resource set is configured for enhanced downlink control channel monitoring. The operations of 1315 may be performed according to the methods described herein. In some examples, aspects of the operations of 1315 may be performed by a configuration receiving component as described with reference to FIGS. 4 through 7.

At 1320, the UE may monitor one or more downlink control channels in accordance with the enhanced downlink control channel monitoring capability of the UE. The operations of 1320 may be performed according to the methods described herein. In some examples, aspects of the operations of 1320 may be performed by a monitoring component as described with reference to FIGS. 4 through 7.

Figure 14:
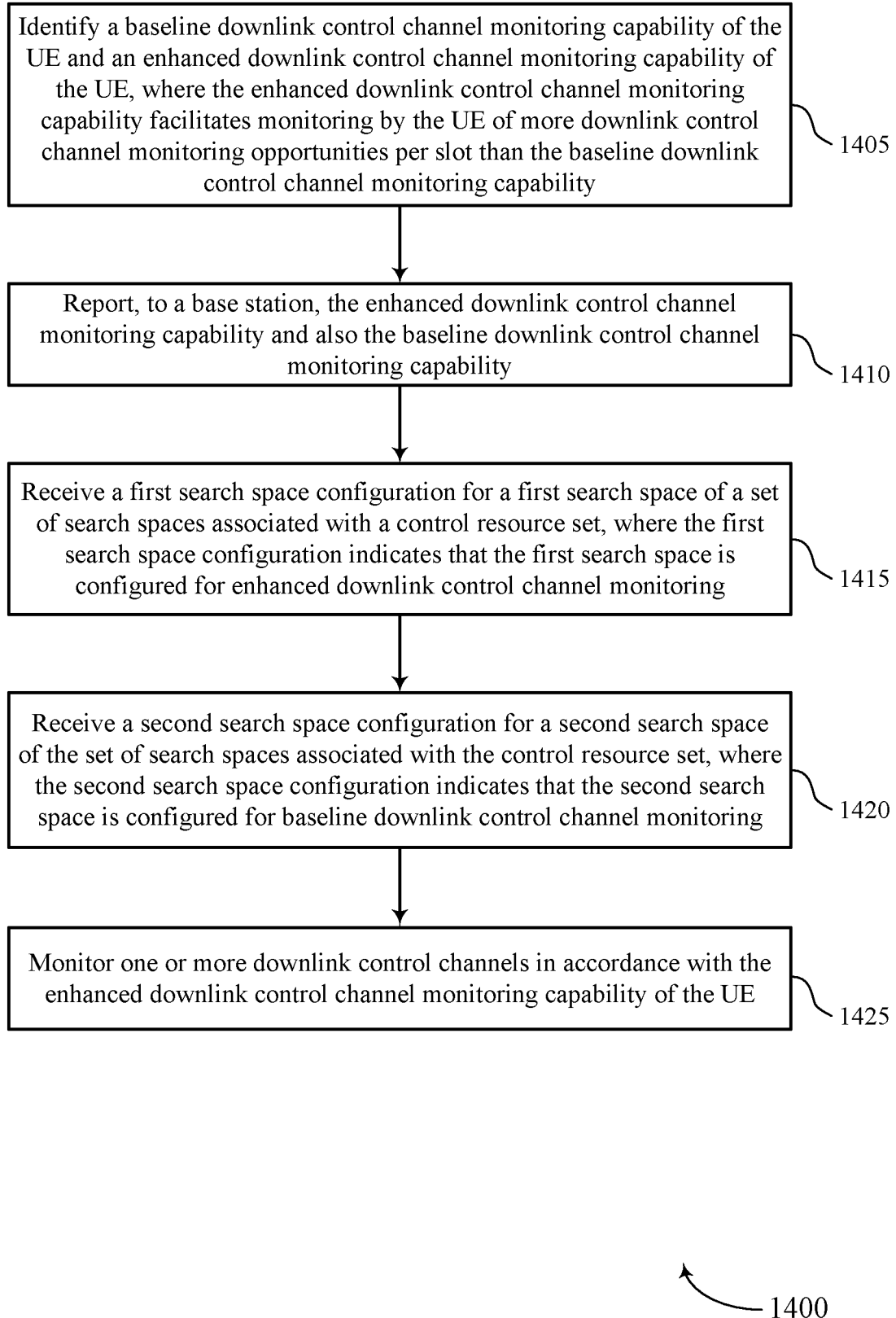

FIG. 14 shows a flowchart illustrating a method 1400 that supports downlink control channel monitoring capability for ultra-reliable low-latency communications in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may identify a baseline downlink control channel monitoring capability of the UE and an enhanced downlink control channel monitoring capability of the UE, where the enhanced downlink control channel monitoring capability facilitates monitoring by the UE of more downlink control channel monitoring opportunities per slot than the baseline downlink control channel monitoring capability. The operations of 1405 may be performed according to the methods described herein. In some examples, aspects of the operations of 1405 may be performed by a capability identifying component as described with reference to FIGS. 4 through 7.

At 1410, the UE may report, to a base station, the enhanced downlink control channel monitoring capability and also the baseline downlink control channel monitoring capability. The operations of 1410 may be performed according to the methods described herein. In some examples, aspects of the operations of 1410 may be performed by a capability reporting component as described with reference to FIGS. 4 through 7.

At 1415, the UE may receive a first search space configuration for a first search space of a set of search spaces associated with a control resource set, where the first search space configuration indicates that the first search space is configured for enhanced downlink control channel monitoring. The operations of 1415 may be performed according to the methods described herein. In some examples, aspects of the operations of 1415 may be performed by a configuration receiving component as described with reference to FIGS. 4 through 7.

At 1420, the UE may receive a second search space configuration for a second search space of the set of search spaces associated with the control resource set, where the second search space configuration indicates that the second search space is configured for baseline downlink control channel monitoring. The operations of 1420 may be performed according to the methods described herein. In some examples, aspects of the operations of 1420 may be performed by a configuration receiving component as described with reference to FIGS. 4 through 7.

At 1425, the UE may monitor one or more downlink control channels in accordance with the enhanced downlink control channel monitoring capability of the UE. The operations of 1425 may be performed according to the methods described herein. In some examples, aspects of the operations of 1425 may be performed by a monitoring component as described with reference to FIGS. 4 through 7.

Figure 15:
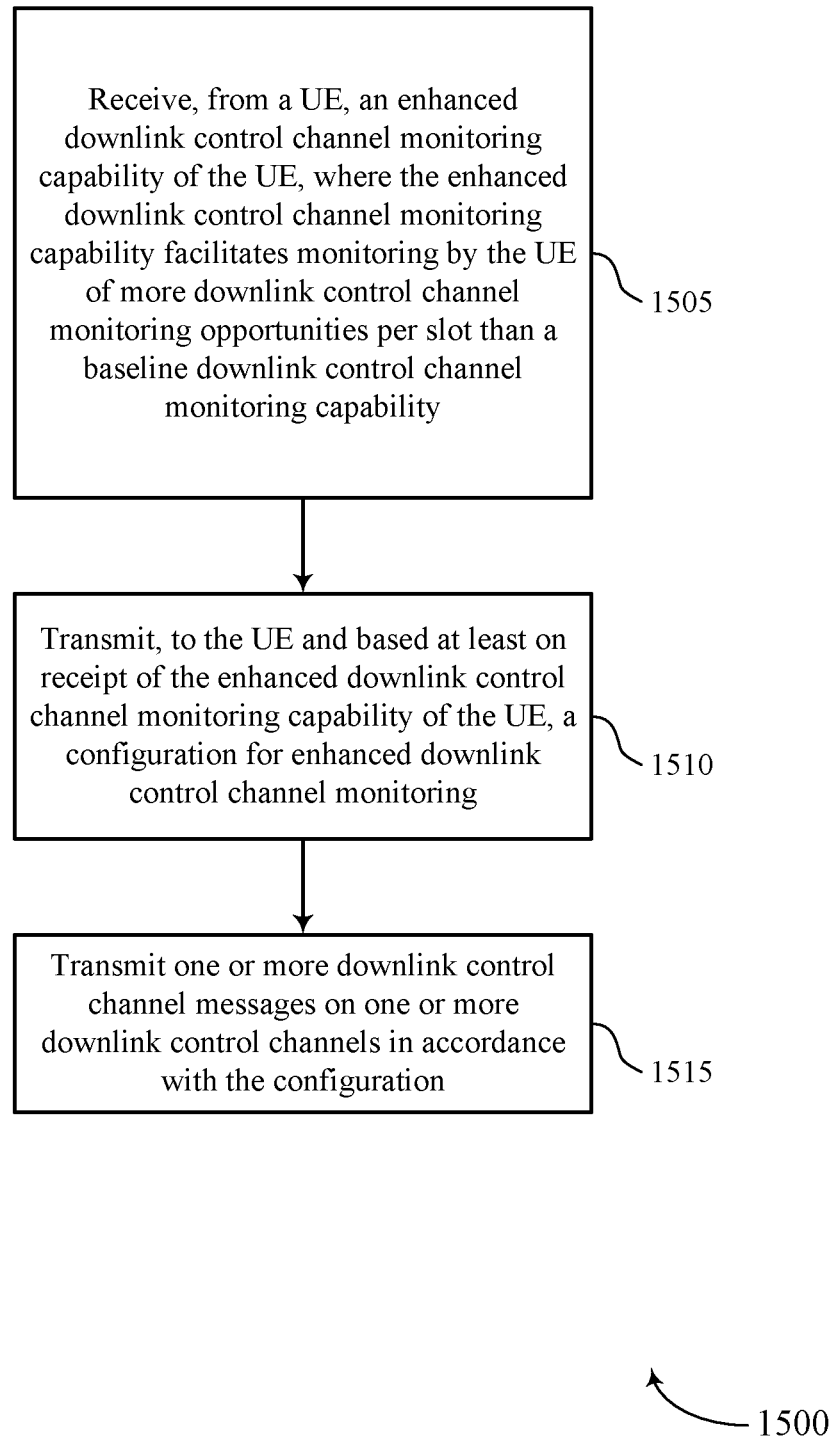

FIG. 15 shows a flowchart illustrating a method 1500 that supports downlink control channel monitoring capability for ultra-reliable low-latency communications in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive, from a UE, an enhanced downlink control channel monitoring capability of the UE, where the enhanced downlink control channel monitoring capability facilitates monitoring by the UE of more downlink control channel monitoring opportunities per slot than a baseline downlink control channel monitoring capability. In some cases, the base station may receive the baseline downlink control channel monitoring capability of the UE. The operations of 1505 may be performed according to the methods described herein. In some examples, aspects of the operations of 1505 may be performed by a reported capability component as described with reference to FIGS. 8 through 11.

At 1510, the base station may transmit, to the UE and based at least on receipt of the enhanced downlink control channel monitoring capability of the UE, a configuration for enhanced downlink control channel monitoring. The operations of 1510 may be performed according to the methods described herein. In some examples, aspects of the operations of 1510 may be performed by a configuration transmitting component as described with reference to FIGS. 8 through 11.

At 1515, the base station may transmit one or more downlink control channel messages on one or more downlink control channels in accordance with the configuration. The operations of 1515 may be performed according to the methods described herein. In some examples, aspects of the operations of 1515 may be performed by a control channel message transmitting component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   reporting, to a base station, an enhanced downlink control channel monitoring capability, wherein the enhanced downlink control channel monitoring capability facilitates monitoring by the UE of more downlink control channel monitoring opportunities per slot than a baseline downlink control channel monitoring capability;
   receiving, based at least on the UE reporting the enhanced downlink control channel monitoring capability, a configuration for enhanced downlink control channel monitoring; and
   monitoring one or more downlink control channels in accordance with the enhanced downlink control channel monitoring capability of the UE.

2. The method of claim 1, wherein the receiving comprises:
   receiving at least one control resource set configuration that includes an indication that a corresponding control resource set is configured for enhanced downlink control channel monitoring.

3. The method of claim 1, wherein reporting the enhanced downlink control channel monitoring capability comprises:
   reporting a number of cells for which the UE supports the enhanced downlink control channel monitoring.

4. The method of claim 3, wherein the number of cells is less than or equal to a number of cells for which the UE supports a shorter of two different minimum downlink processing times.

5. The method of claim 3, further comprising:
   determining that a number of cells configured for enhanced downlink control channel monitoring exceeds the number of cells.

6. The method of claim 3, wherein:
   a number of blind decodings for the enhanced downlink control channel monitoring is based at least in part on an equal split of a maximum number of blind decodings across a number of cells configured for the enhanced downlink control channel monitoring; and
   a number of control channel elements for the enhanced downlink control channel monitoring is based at least in part on an equal split of a maximum number of control channel elements across the number of cells configured for the enhanced downlink control channel monitoring.

7. The method of claim 1, further comprising:
   reporting, to the base station, a number of downlink control information sizes supported by the UE for the enhanced downlink control channel monitoring capability.

8. The method of claim 1, further comprising:
   reporting, to the base station, a per downlink control channel monitoring span blind decoding limit or a per downlink control channel monitoring span control channel element processing limit supported by the UE that corresponds with the enhanced downlink control channel monitoring capability.

9. The method of claim 1, wherein receiving the configuration comprises:
   receiving a plurality of control resource set configurations, each for a corresponding control resource set, wherein a first portion of the corresponding control resource sets are configured for enhanced downlink control channel monitoring and a second portion of the corresponding control resource sets are configured for baseline downlink control channel monitoring.

10. The method of claim 9, further comprising:
    receiving search space configurations which result in overbooking of downlink control channel candidates to be monitored or non-overlapping control channel elements to be processed, wherein the search space configurations are associated with only the second portion of the corresponding control resource sets.

11. The method of claim 1, wherein receiving the configuration comprises:
    receiving a plurality of control resource set configurations, each for a corresponding control resource set, wherein each of the corresponding control resource sets are configured for enhanced downlink control channel monitoring.

12. The method of claim 11, further comprising:
    receiving search space configurations which result in overbooking of downlink control channel candidates to be monitored or non-overlapping control channel elements to be processed, wherein the overbooking of downlink control channel candidates occurs only in a first downlink control channel monitoring span of a slot.

13. The method of claim 12, further comprising:
    dropping lower priority downlink control channel candidates associated with the first downlink control channel monitoring span based at least in part on the overbooking.

14. The method of claim 11, wherein the plurality of control resource set configurations are configured for a primary cell.

15. The method of claim 1, wherein receiving the configuration comprises:
    receiving a plurality of search space configurations, each for a corresponding search space, wherein each of the corresponding search spaces are configured for enhanced downlink control channel monitoring.

16. The method of claim 15, wherein the plurality of search space configurations result in overbooking of downlink control channel candidates to be monitored or non-overlapping control channel elements to be processed, wherein the overbooking of downlink control channel candidates occurs only in a first downlink control channel monitoring span of a slot.

17. The method of claim 15, wherein the plurality of search space configurations are configured for a primary cell.

18. The method of claim 15, further comprising:
dropping lower priority downlink control channel candidates associated with the first downlink control channel monitoring span based at least in part on the overbooking.

19. The method of claim 1, further comprising:
receiving search space configurations, configured for enhanced downlink control channel monitoring, which result in overbooking of downlink control channel candidates to be monitored or non-overlapping control channel elements to be processed, wherein the overbooking is associated with only downlink control channel monitoring spans that include common search spaces.

20. The method of claim 19, wherein the search space configurations are further associated with only a portion of slots that include both common search spaces and UE-specific search spaces within the downlink control channel monitoring spans that include common search spaces and UE-specific search spaces.

21. The method of claim 1, wherein the reporting comprises:
reporting the baseline downlink control channel monitoring capability to the base station.

22. A method for wireless communication at a base station, comprising:
receiving, from a user equipment (UE), an enhanced downlink control channel monitoring capability of the UE, wherein the enhanced downlink control channel monitoring capability facilitates monitoring by the UE of more downlink control channel monitoring opportunities per slot than a baseline downlink control channel monitoring capability of the UE;
transmitting, to the UE and based at least on receipt of the enhanced downlink control channel monitoring capability of the UE, a configuration for enhanced downlink control channel monitoring; and
transmitting one or more downlink control channel messages on one or more downlink control channels in accordance with the configuration.

23. The method of claim 22, wherein transmitting the configuration comprises:
transmitting a plurality of control resource set configurations, each for a corresponding control resource set, wherein a first portion of the corresponding control resource sets are configured for enhanced downlink control channel monitoring and a second portion of the corresponding control resource sets are configured for baseline downlink control channel monitoring.

24. The method of claim 23, further comprising:
transmitting search space configurations which result in overbooking of downlink control channel candidates to be monitored or non-overlapping control channel elements to be processed, wherein the search space configurations are associated with only the second portion of the corresponding control resource sets.

25. The method of claim 22, wherein transmitting the configuration comprises:
transmitting a plurality of control resource set configurations, each for a corresponding control resource set, wherein each of the corresponding control resource sets are configured for enhanced downlink control channel monitoring.

26. The method of claim 25, further comprising:
transmitting search space configurations which result in overbooking of downlink control channel candidates to be monitored or non-overlapping control channel elements to be processed, wherein the overbooking is associated with only in a first downlink control channel monitoring span of a slot.

27. The method of claim 25, further comprising:
transmitting search space configurations which result in overbooking of downlink control channel candidates to be monitored or non-overlapping control channel elements to be processed, wherein the overbooking is associated with only downlink control channel monitoring spans that include common search spaces.

28. The method of claim 27, wherein the search space configurations are further associated with only a portion of slots that include both common search spaces and UE-specific search spaces within the downlink control channel monitoring spans that include common search spaces and UE-specific search spaces.

29. An apparatus for wireless communication at a user equipment (UE), comprising:
a processor,
memory coupled with the processor; and
instructions stored in the memory and executable by the processor to cause the apparatus to:
report, to a base station, an enhanced downlink control channel monitoring capability, wherein the enhanced downlink control channel monitoring capability facilitates monitoring by the UE of more downlink control channel monitoring opportunities per slot than a baseline downlink control channel monitoring capability;
receive, based at least on the UE reporting the enhanced downlink control channel monitoring capability, a configuration for enhanced downlink control channel monitoring; and
monitor one or more downlink control channels in accordance with the enhanced downlink control channel monitoring capability of the UE.

30. An apparatus for wireless communication at a base station, comprising:
a processor,
memory coupled with the processor; and
instructions stored in the memory and executable by the processor to cause the apparatus to:
receive, from a user equipment (UE), an enhanced downlink control channel monitoring capability of the UE, wherein the enhanced downlink control channel monitoring capability facilitates monitoring by the UE of more downlink control channel monitoring opportunities per slot than a baseline downlink control channel monitoring capability of the UE;
transmit, to the UE and based at least on receipt of the enhanced downlink control channel monitoring capability of the UE, a configuration for enhanced downlink control channel monitoring; and
transmit one or more downlink control channel messages on one or more downlink control channels in accordance with the configuration.

* * * * *